(12) United States Patent
Hoja et al.

(10) Patent No.: US 10,084,672 B2
(45) Date of Patent: Sep. 25, 2018

(54) SYSTEM AND METHOD FOR MEASURING PERFORMANCE AND AVAILABILITY OF APPLICATIONS UTILIZING MONITORING OF DISTRIBUTED SYSTEMS PROCESSES COMBINED WITH ANALYSIS OF THE NETWORK COMMUNICATION BETWEEN THE PROCESSES

(71) Applicant: Dynatrace LLC, Waltham, MA (US)

(72) Inventors: Krzysztof Hoja, Gdansk (PL); Grzegorz Pawelczak, Gdansk (PL); Pawel Brzoska, Kolbuddy (PL); Bernd Greifeneder, Linz (AT)

(73) Assignee: Dynatrace LLC, Waltham, MA (US)

( * ) Notice: Subject to any disclaimer, the term of this patent is extended or adjusted under 35 U.S.C. 154(b) by 121 days.

(21) Appl. No.: 15/347,970

(22) Filed: Nov. 10, 2016

(65) Prior Publication Data

US 2017/0134247 A1    May 11, 2017

Related U.S. Application Data

(60) Provisional application No. 62/253,283, filed on Nov. 10, 2015.

(51) Int. Cl.
| | |
|---|---|
| G06F 15/173 | (2006.01) |
| H04L 12/26 | (2006.01) |
| H04L 29/08 | (2006.01) |
| H04L 12/24 | (2006.01) |

(52) U.S. Cl.
CPC ............ *H04L 43/04* (2013.01); *H04L 41/046* (2013.01); *H04L 41/065* (2013.01); *H04L 43/0811* (2013.01); *H04L 43/10* (2013.01); *H04L 67/10* (2013.01)

(58) Field of Classification Search
USPC ....... 709/201, 203, 206, 217, 219, 223, 224, 709/226, 228, 230, 232, 238; 455/418
See application file for complete search history.

(56) References Cited

U.S. PATENT DOCUMENTS

| | | | |
|---|---|---|---|
| 5,655,081 A | 8/1997 | Bonnell et al. | |
| 5,675,798 A | 10/1997 | Chang | |
| 5,878,420 A | 3/1999 | de la Salle | |
| 6,070,190 A | 5/2000 | Reps et al. | |
| 8,402,443 B2 | 3/2013 | Greifeneder et al. | |
| 8,832,665 B2 | 9/2014 | Greifeneder et al. | |
| 9,420,002 B1* | 8/2016 | McGovern | H04L 63/10 |
| 9,723,056 B1* | 8/2017 | Kuo | H04L 67/2823 |
| 2013/0290399 A1* | 10/2013 | Gordon | H04L 67/1097 |
| | | | 709/201 |

(Continued)

*Primary Examiner* — Quang N Nguyen
(74) *Attorney, Agent, or Firm* — Harness, Dickey & Pierce, P.L.C.

(57) ABSTRACT

A performance monitoring and management system is provided for monitoring both server side and network side performance parameters of overall communication between distributed system components. The system can track availability of system component as well as detect problematic topology connections caused by failed or overload elements. The monitoring system combines information from operating system's internal data structures and APIs with information available in raw communication data streams as available at each end of communication channel.

14 Claims, 25 Drawing Sheets

Dependencies and communication between components and influenceof Network Communication Quality on Response Time

(56) References Cited

U.S. PATENT DOCUMENTS

2014/0094159 A1\* 4/2014 Raleigh ................ H04W 24/02
 455/418
2016/0360382 A1\* 12/2016 Gross .................... G06F 3/0488
2017/0078922 A1\* 3/2017 Raleigh ................ H04W 28/10

\* cited by examiner

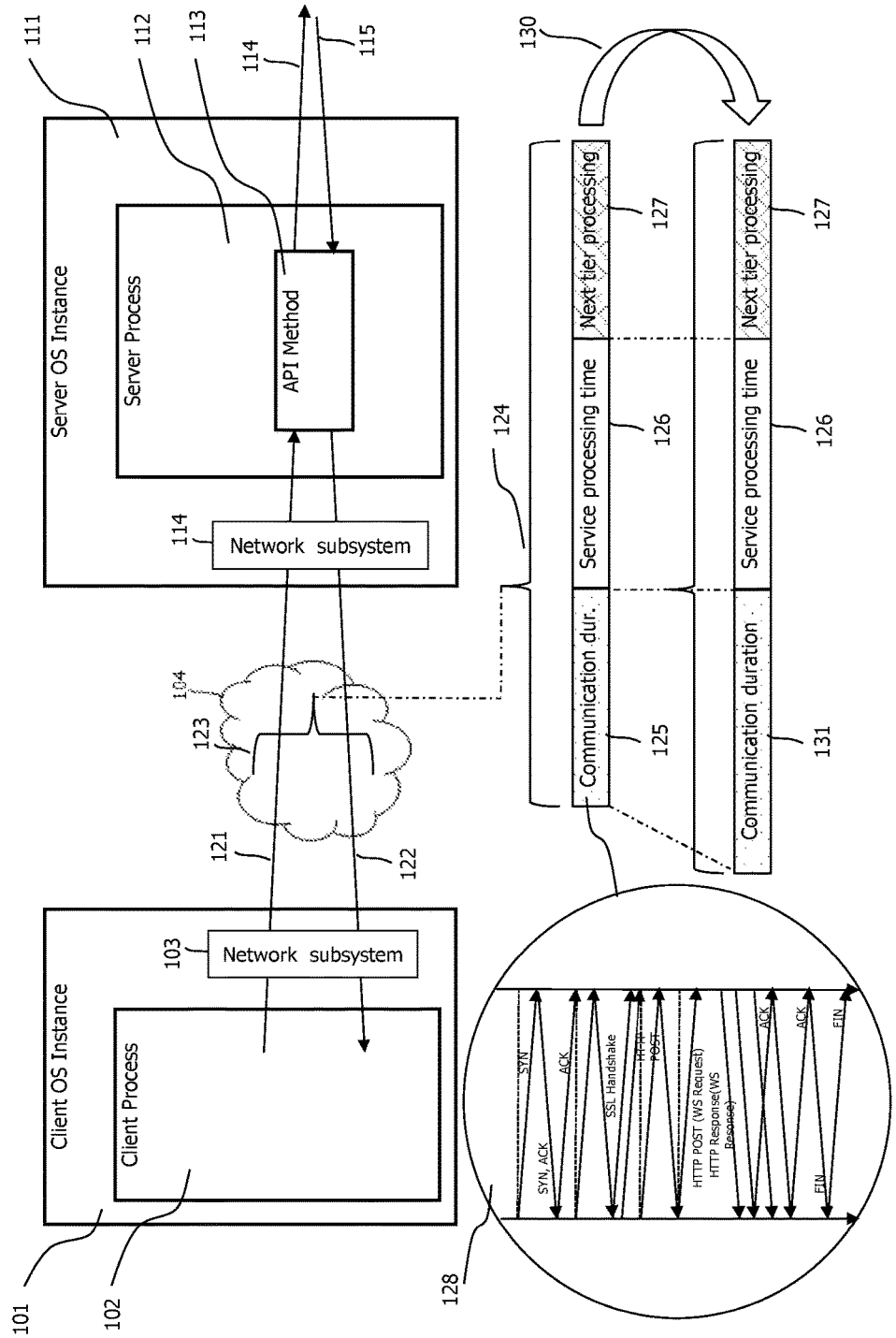
FIG 1: Dependencies and communication between components and influence of Network Communication Quality on Response Time

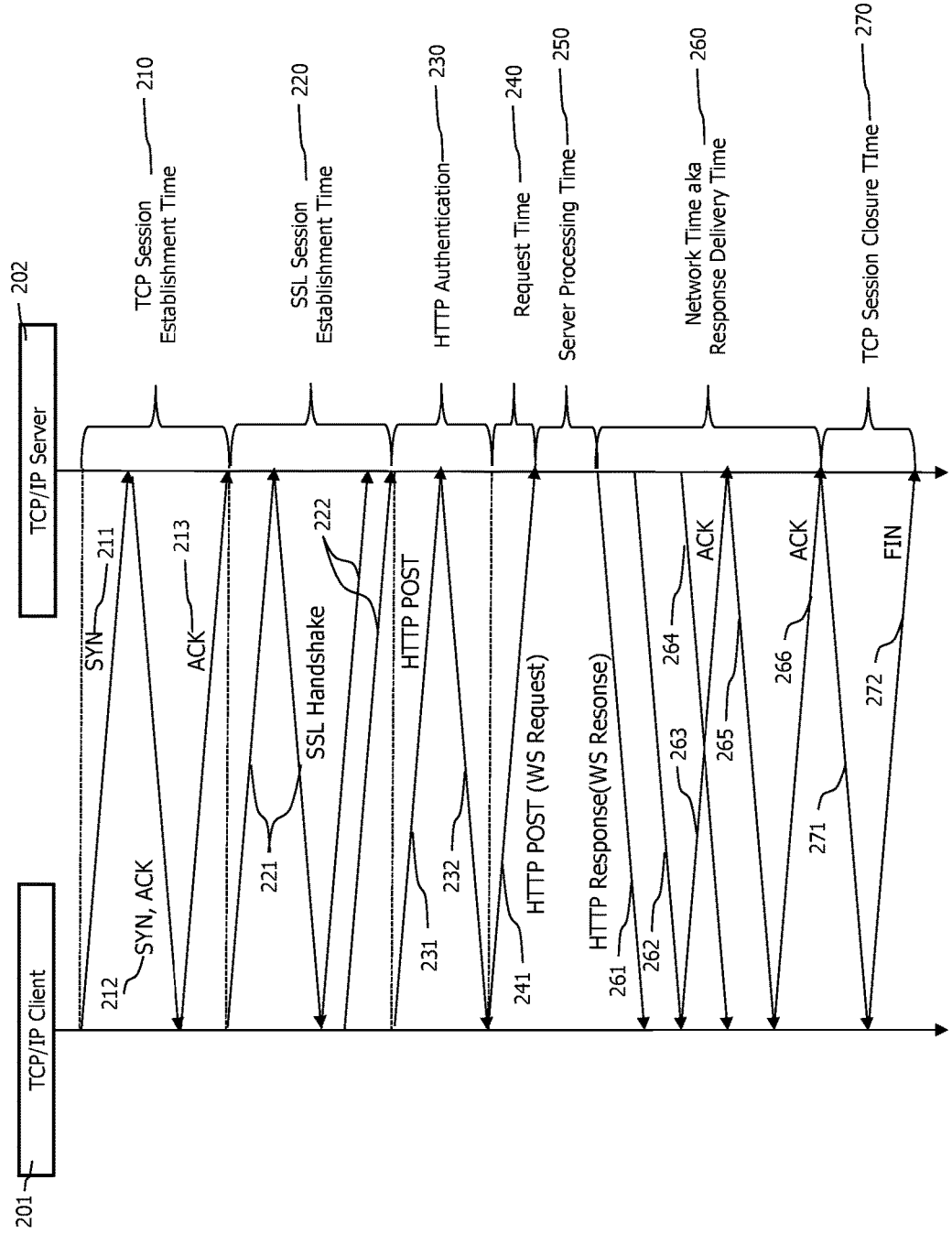
FIG 2: Network Communication Caused by an Exemplary Network Transaction

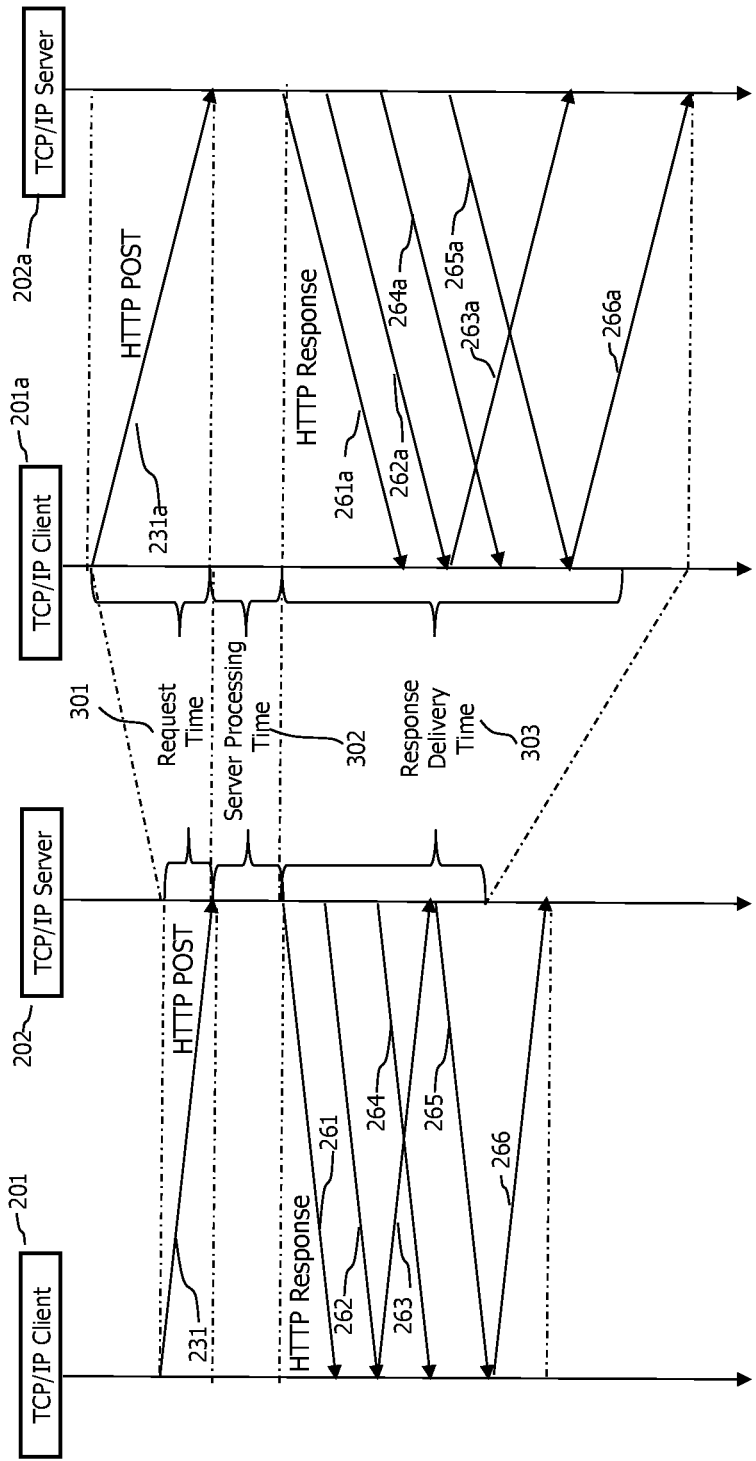
FIG 3: Example of Network Communication Duration Change Due to Quality of Communication: Latency Increase

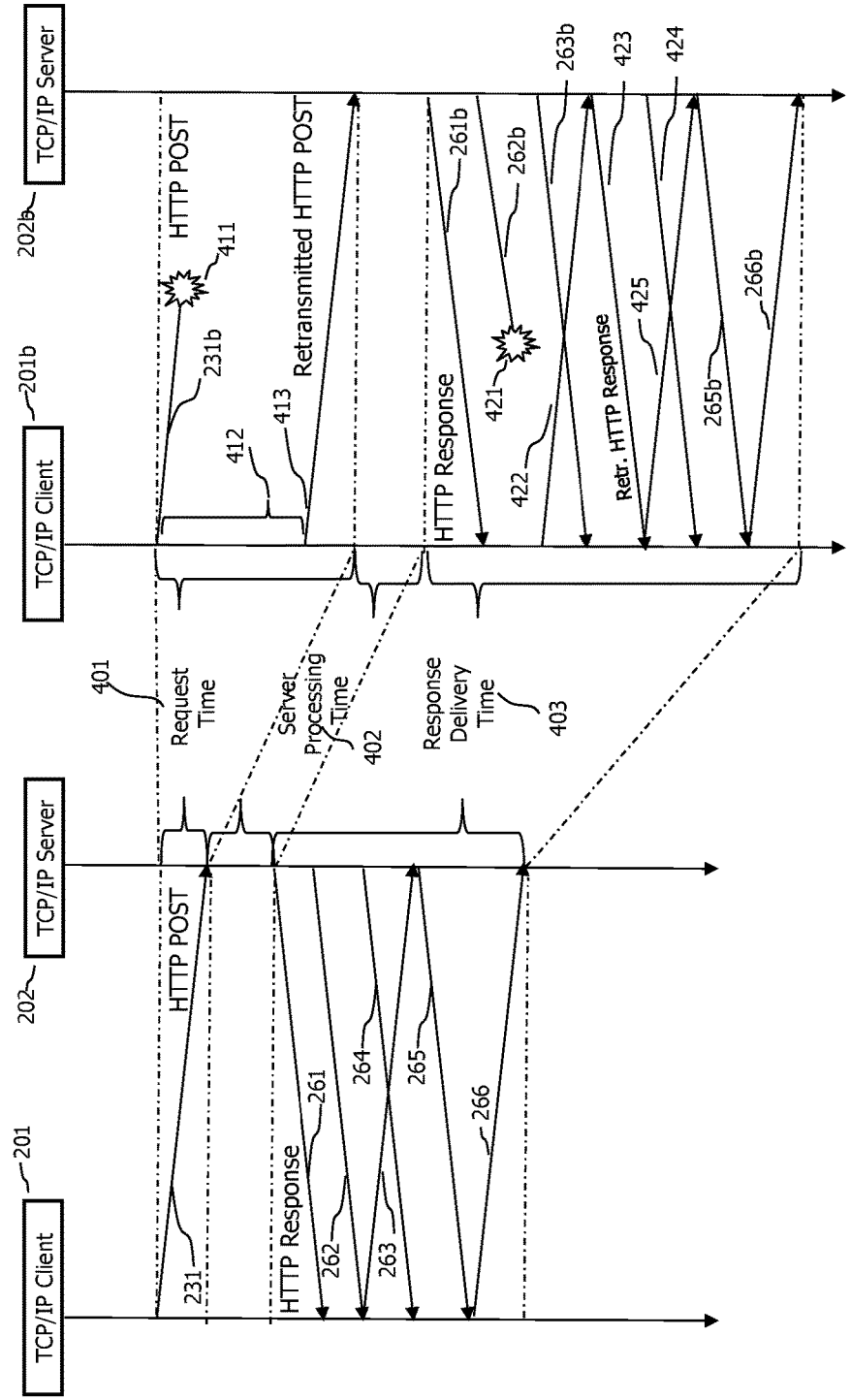
FIG 4: Example of Network Communication Duration Change Due to Quality of Communication: Loss of Packet

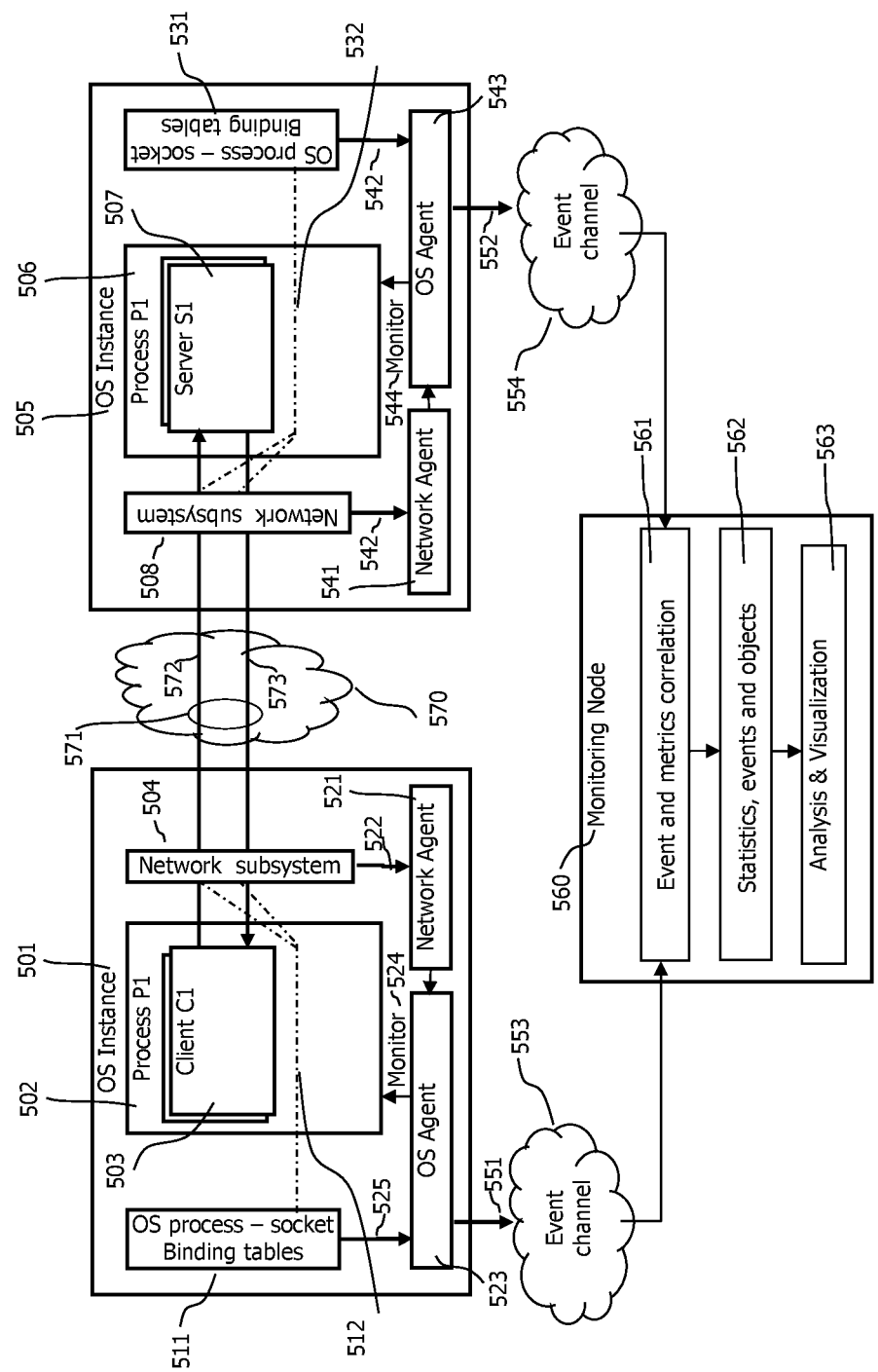
FIG 5: System Overview (without In-Process Agent)

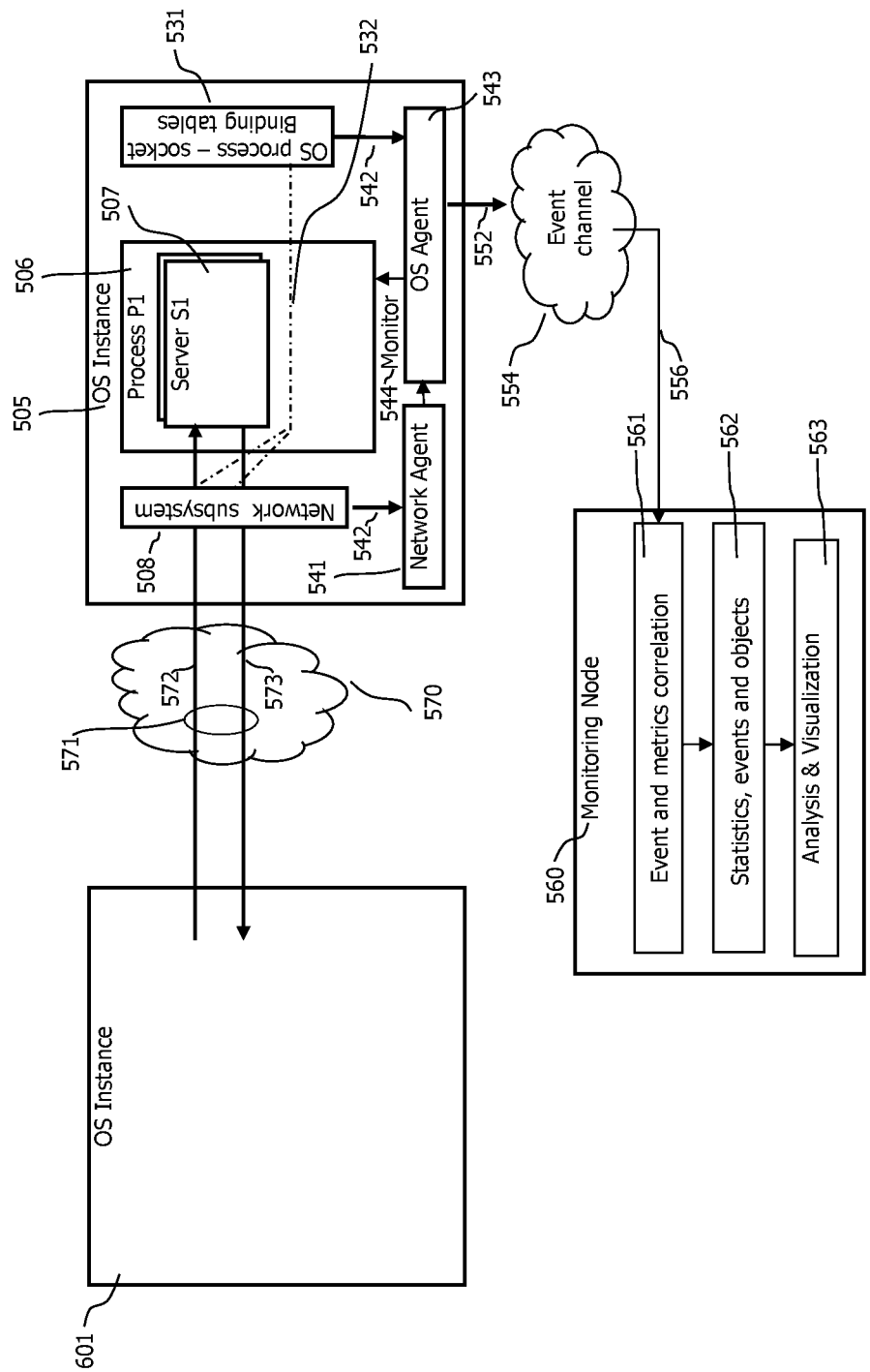

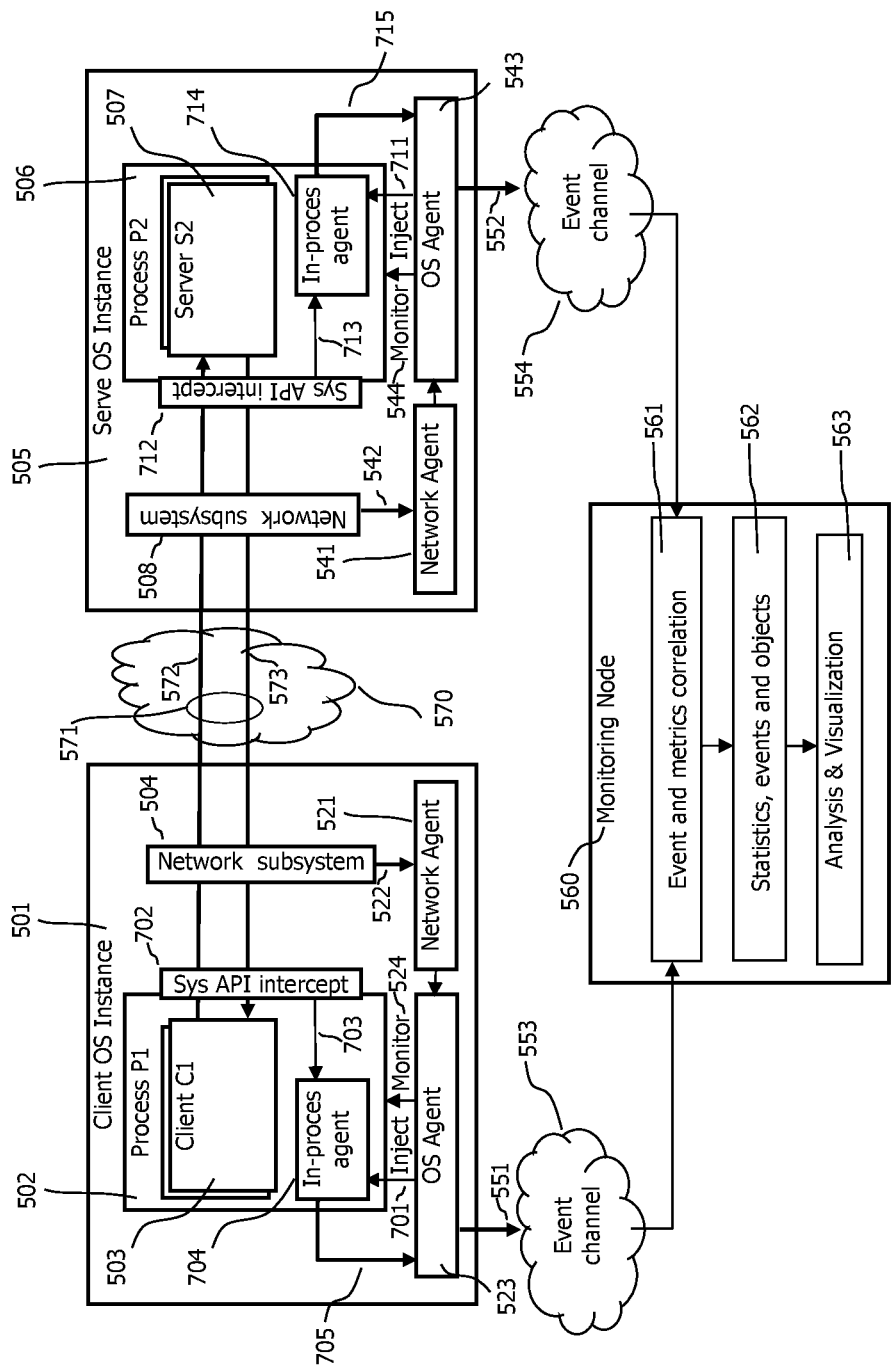
FIG 7: System Overview (with In-Process Agent)

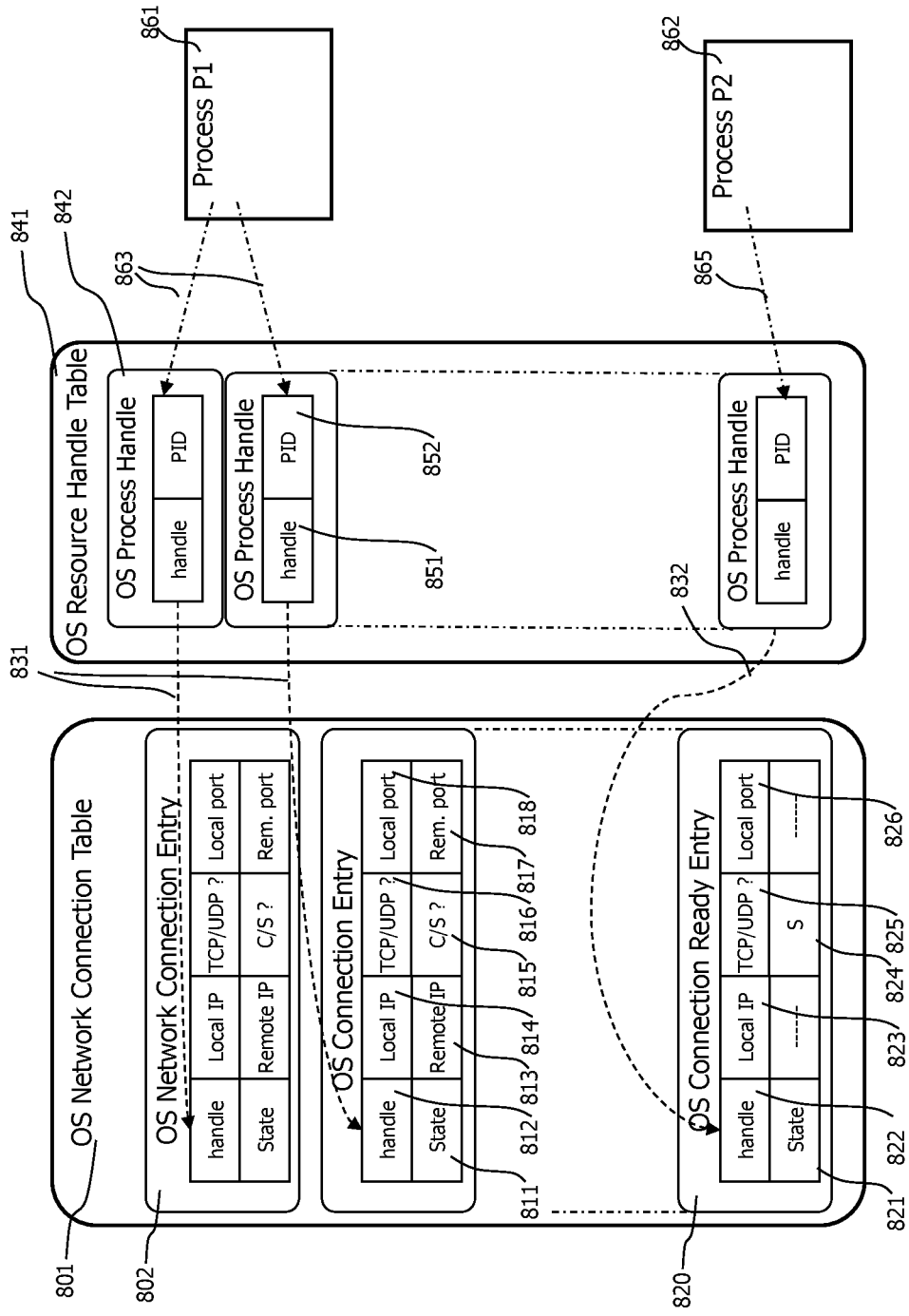
FIG 8: OS's Process-Network Connection Binding Table

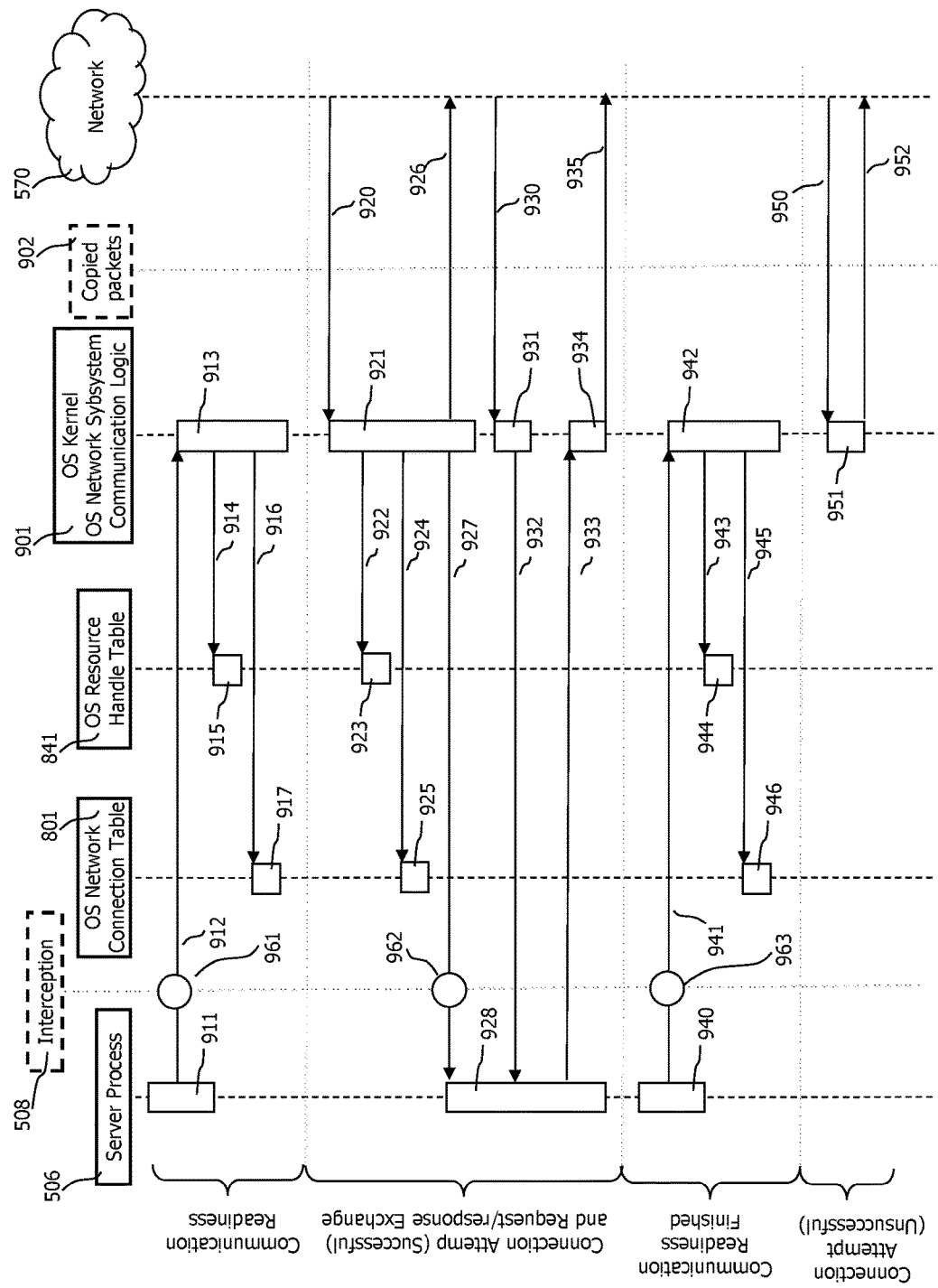
FIG 9: Server Process Interaction with Network Subsystem and Network

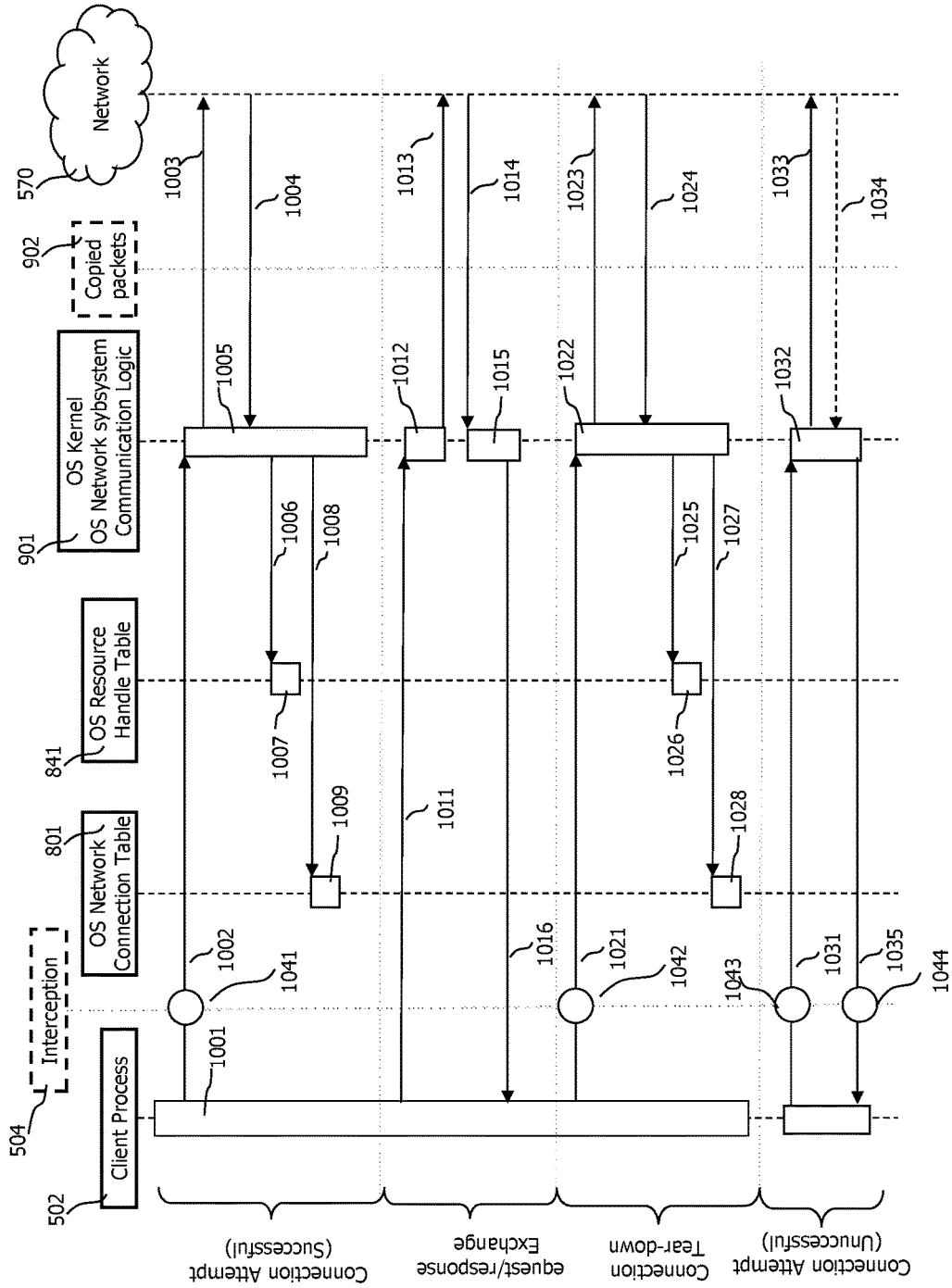
FIG 10: Client Process Interaction with Network Subsystem and Network

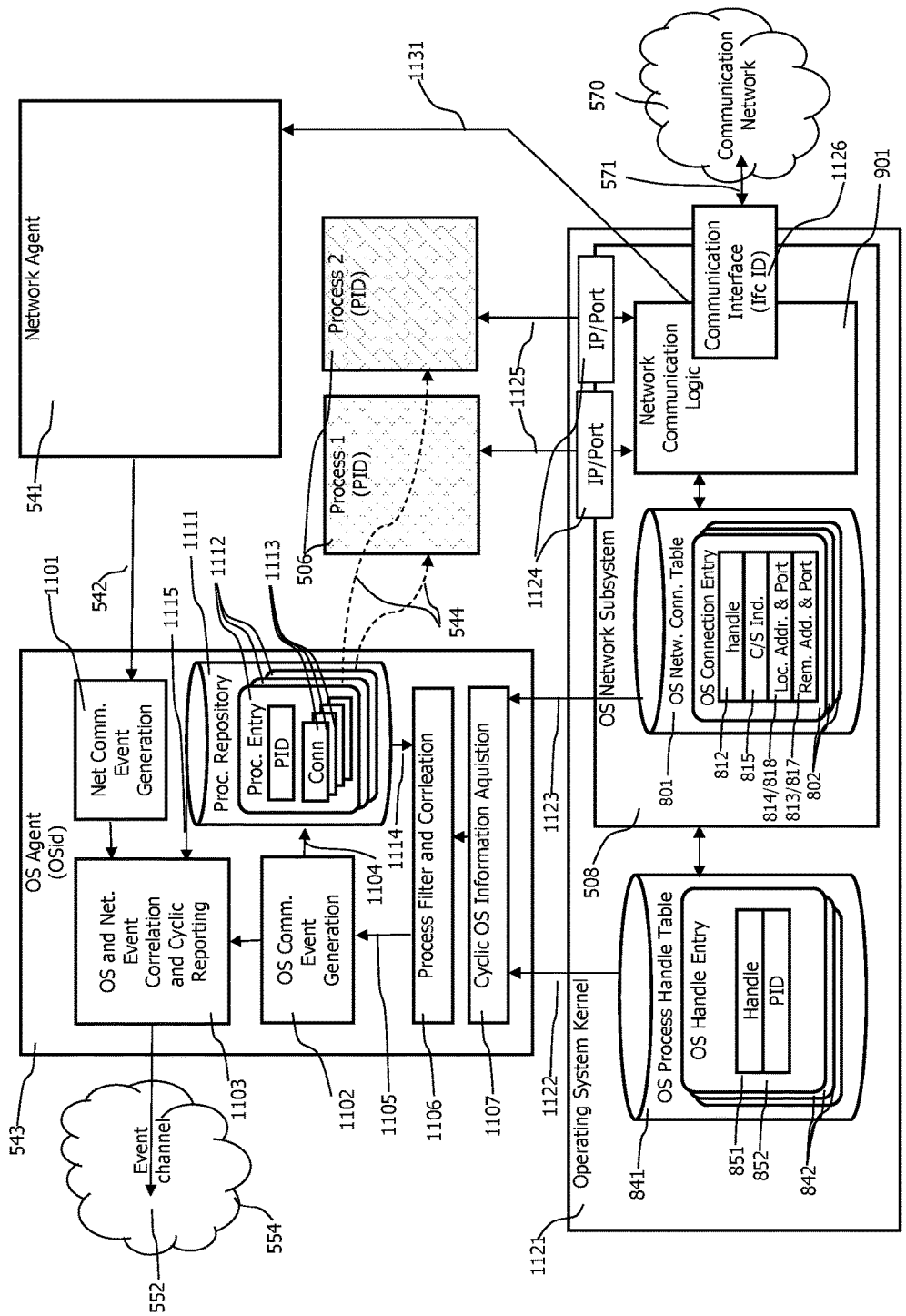
FIG 11: OS Agent Block Diagram (No In-Process Agent). Identification of Open Connections

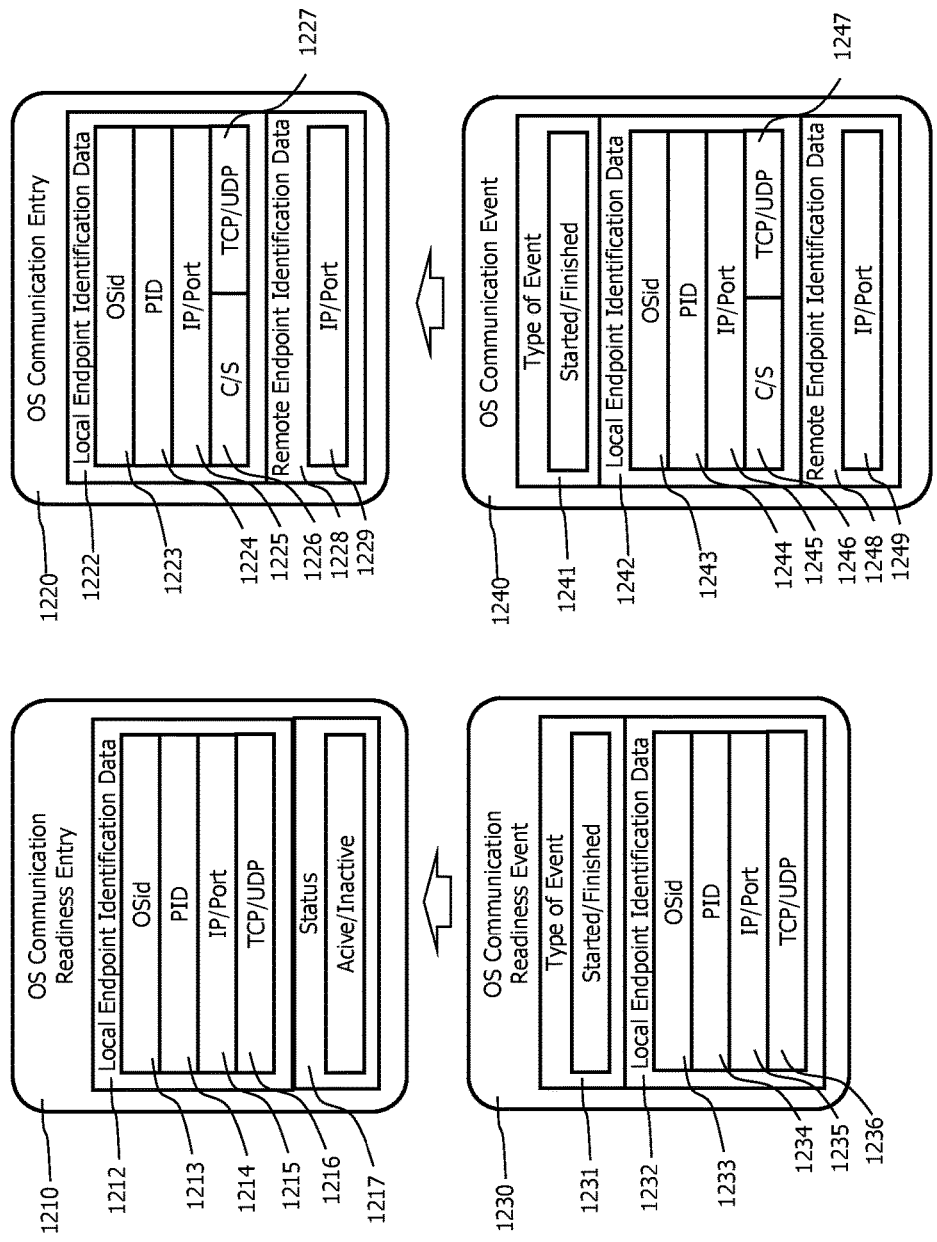
FIG 12: Process Repository Connection Entries and Types of OS Communication Events

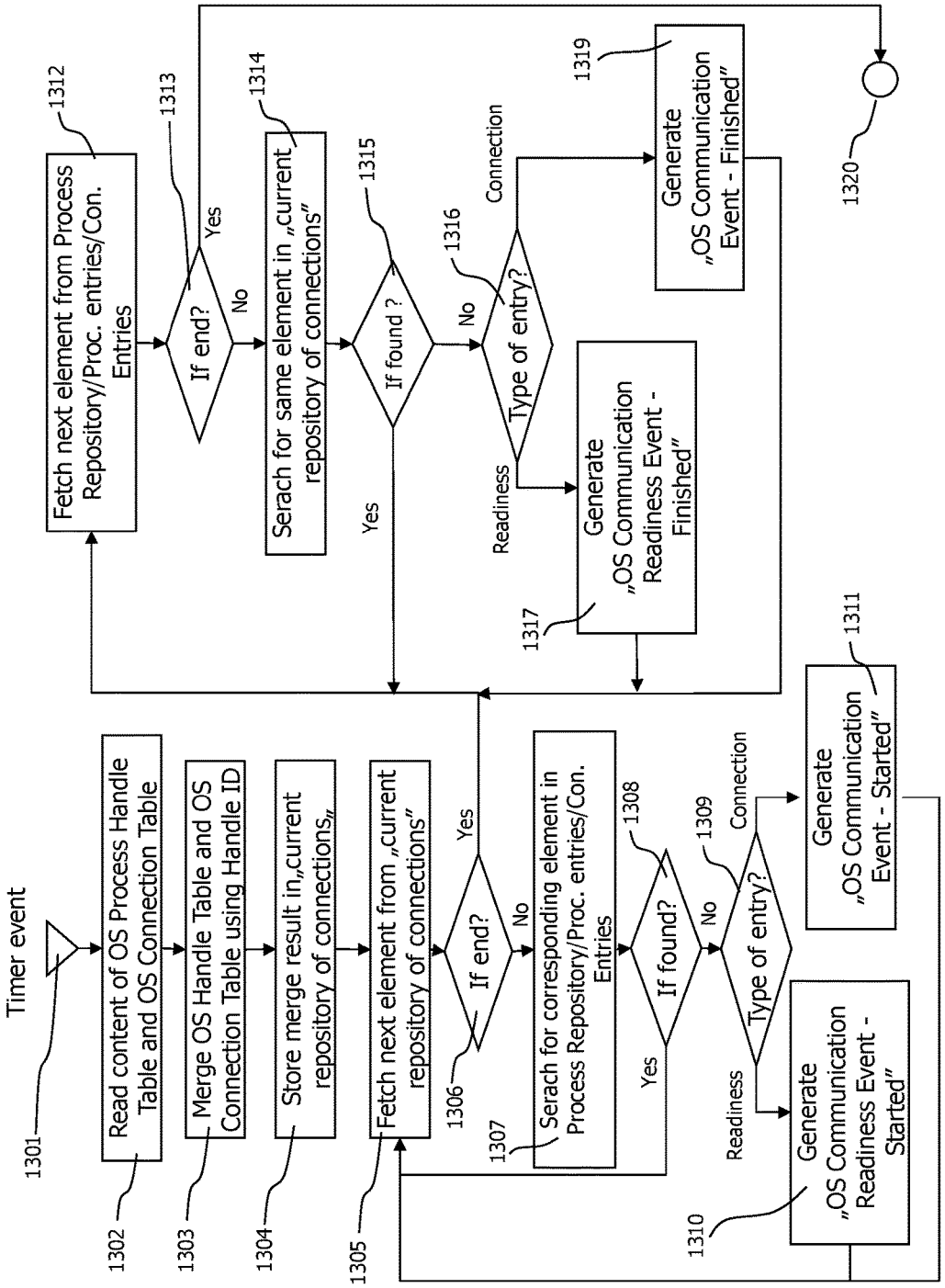

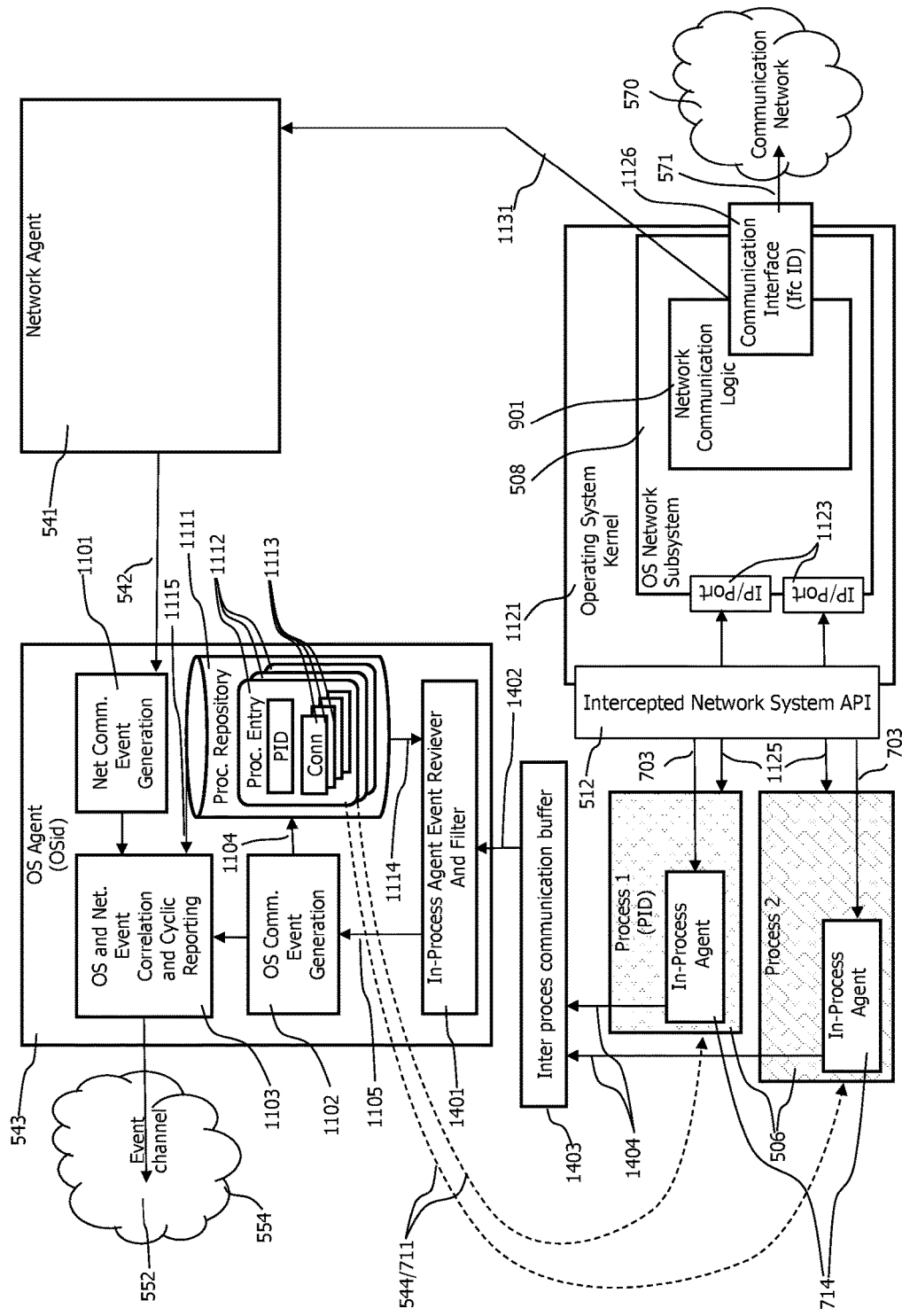
FIG 14: OS Agent Block Diagram (In-Process Agent). Identification of Open Connections

FIG 15: OS Communication Readiness Event Sourced from Intercepted API
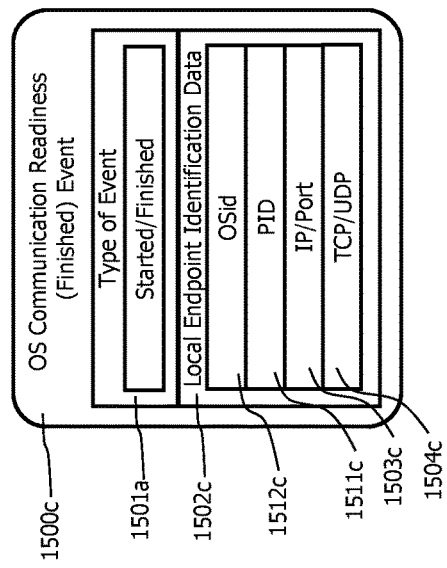
FIG a: Intercepted API Level
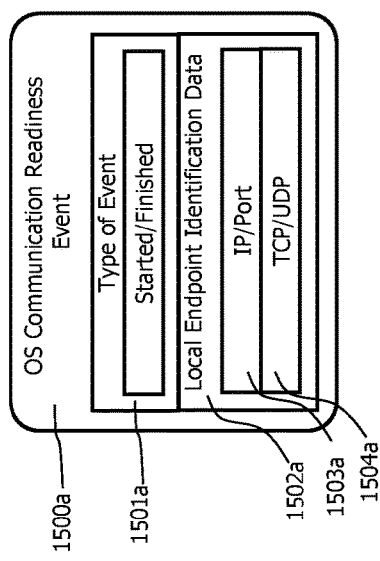
FIG b: In-Process Agent Level
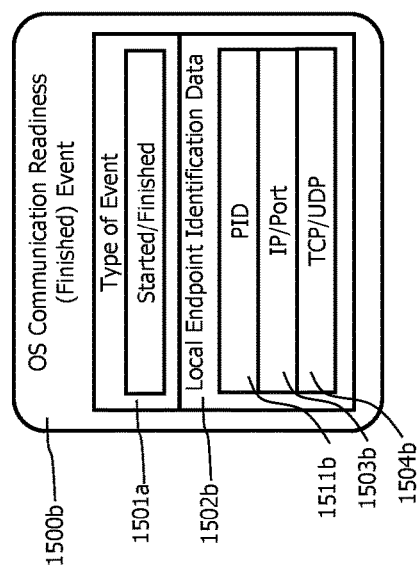
FIG c: OS Agent Level

FIG 16: OS Communication Event Sourced from Intercepted API
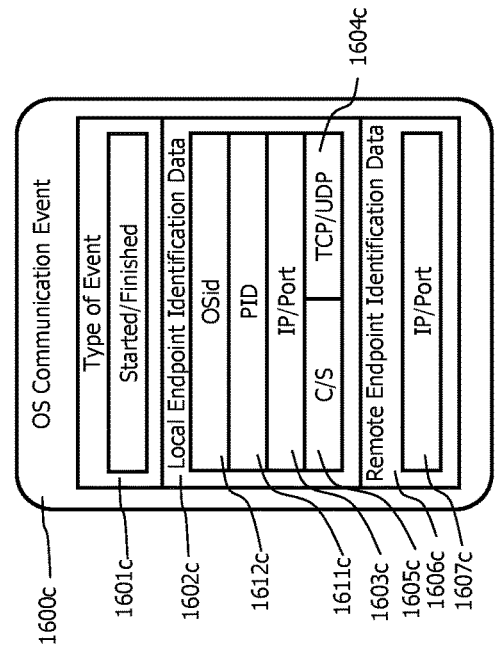
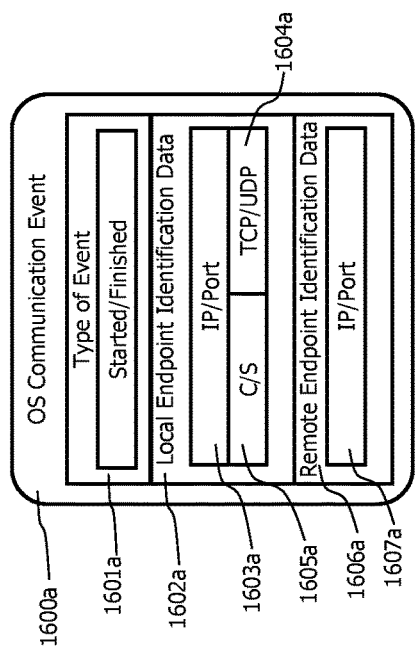
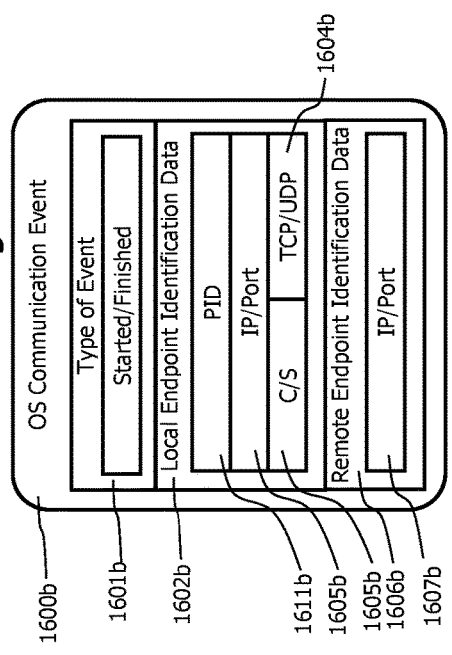

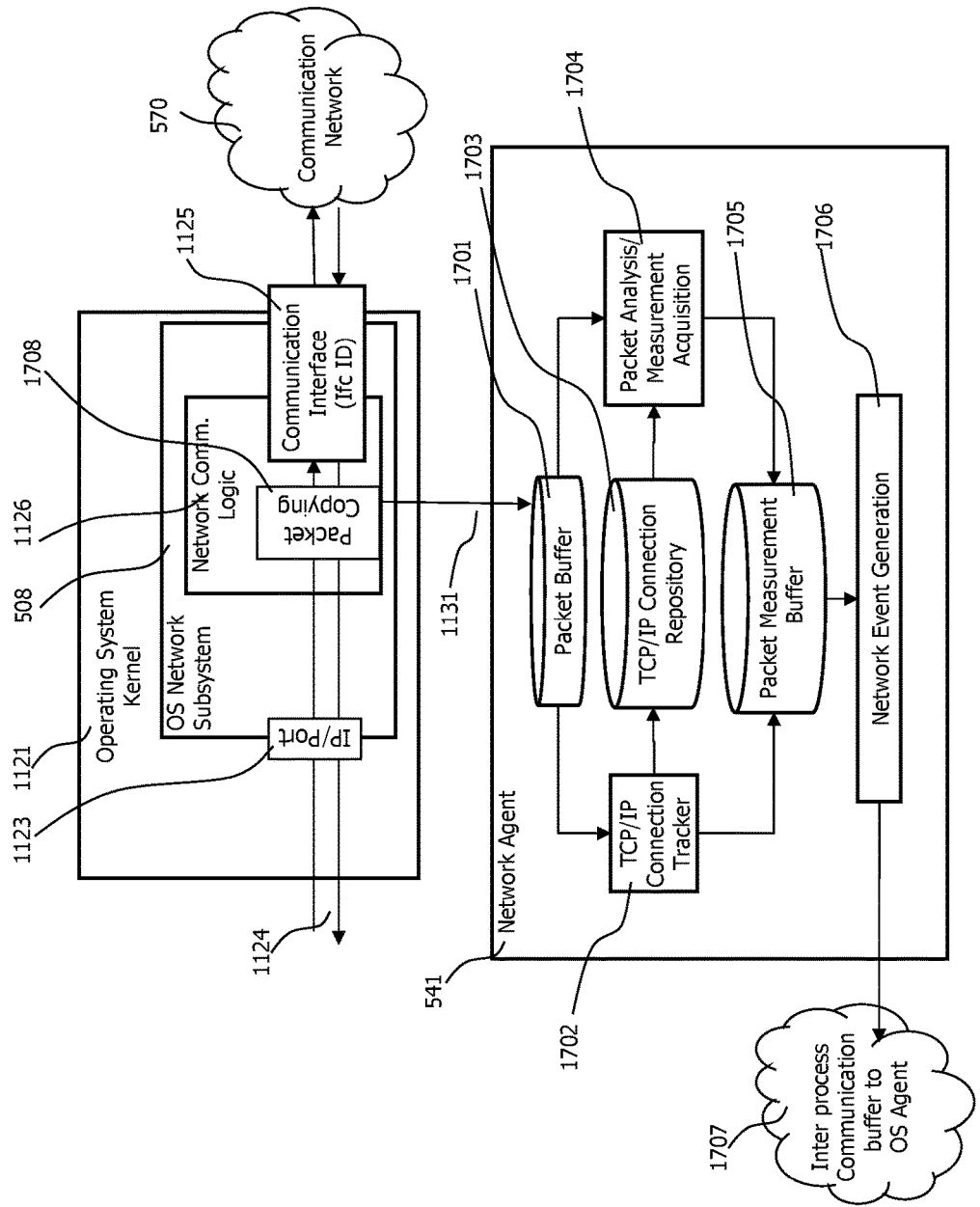
FIG 17: Network Agent Architecture

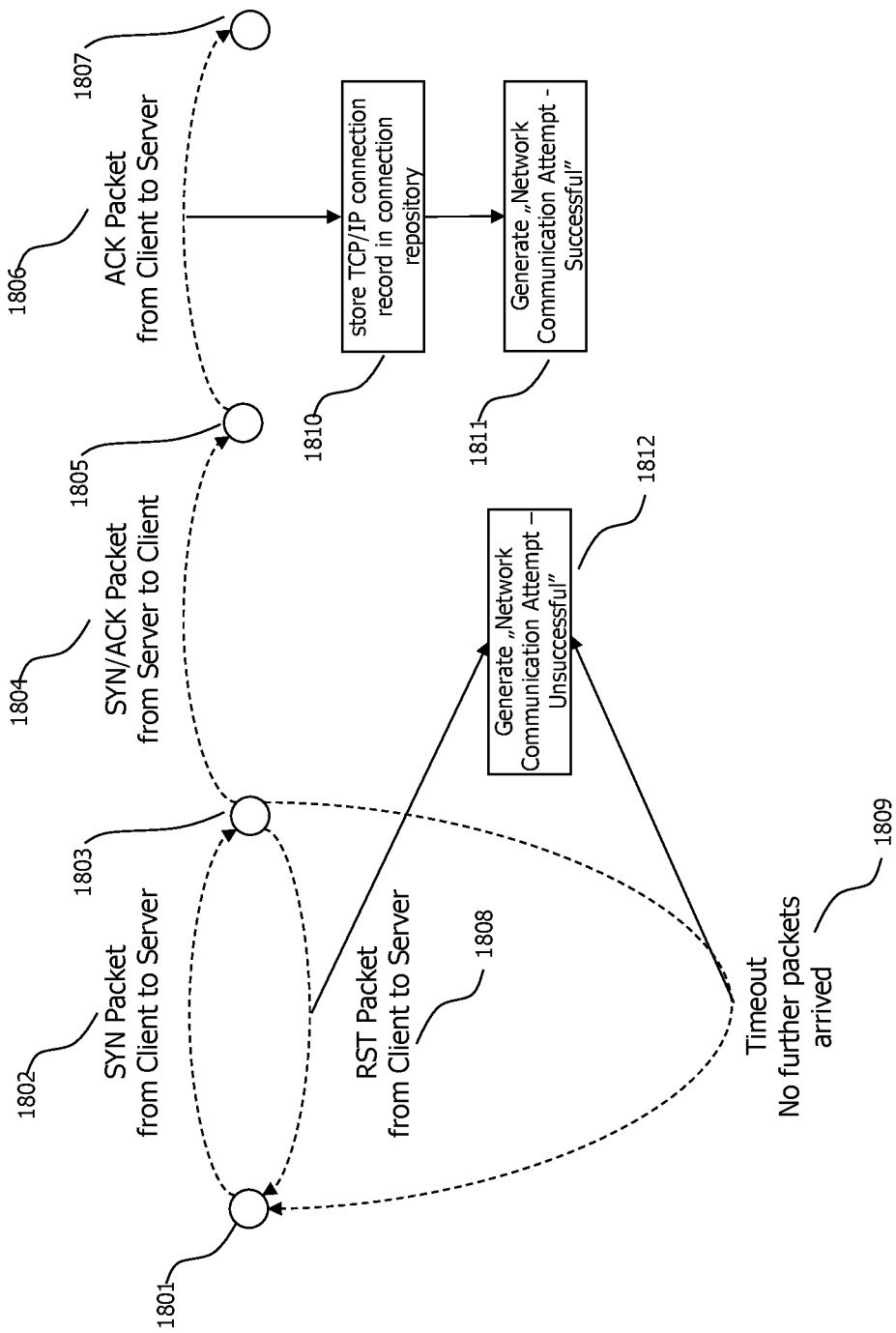
FIG 18: TCP Connection Tracker - Successfully Opened Connection and Failed to Established

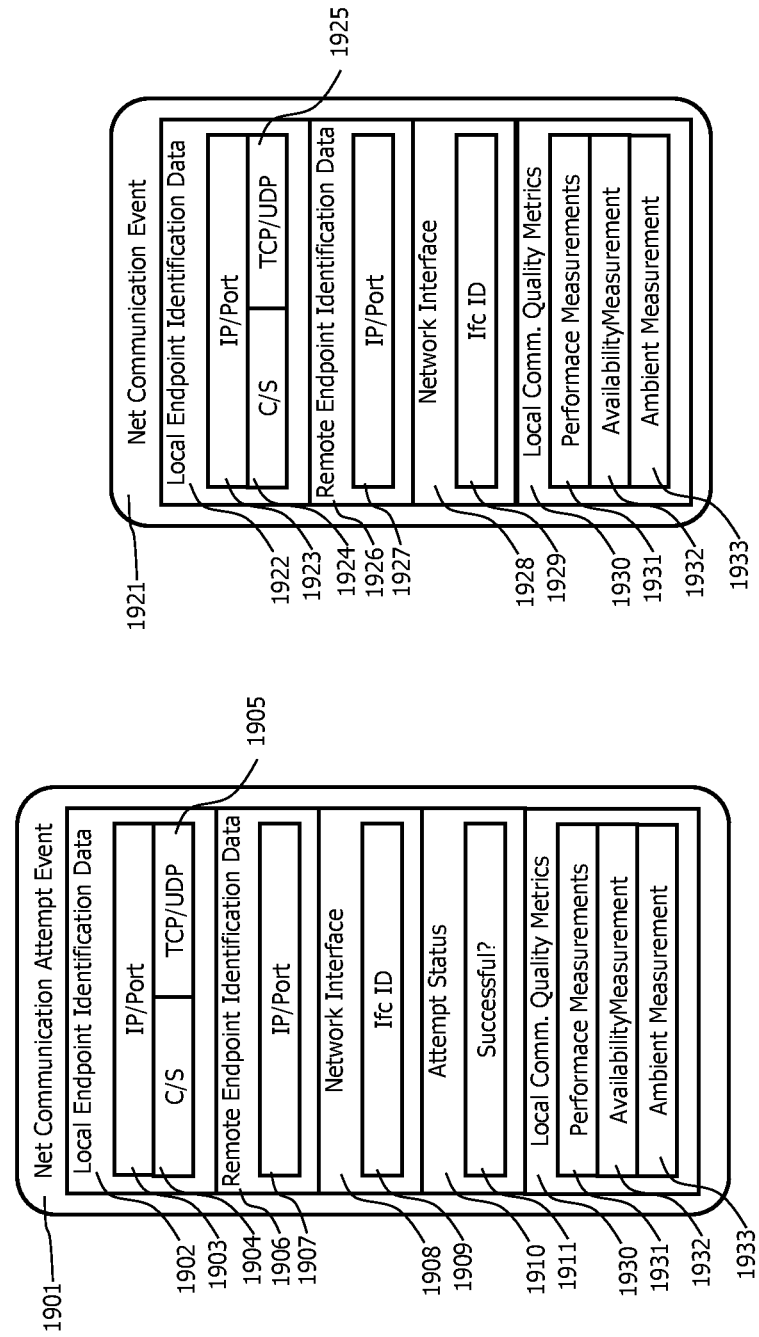
FIG 19: Network Communication Events

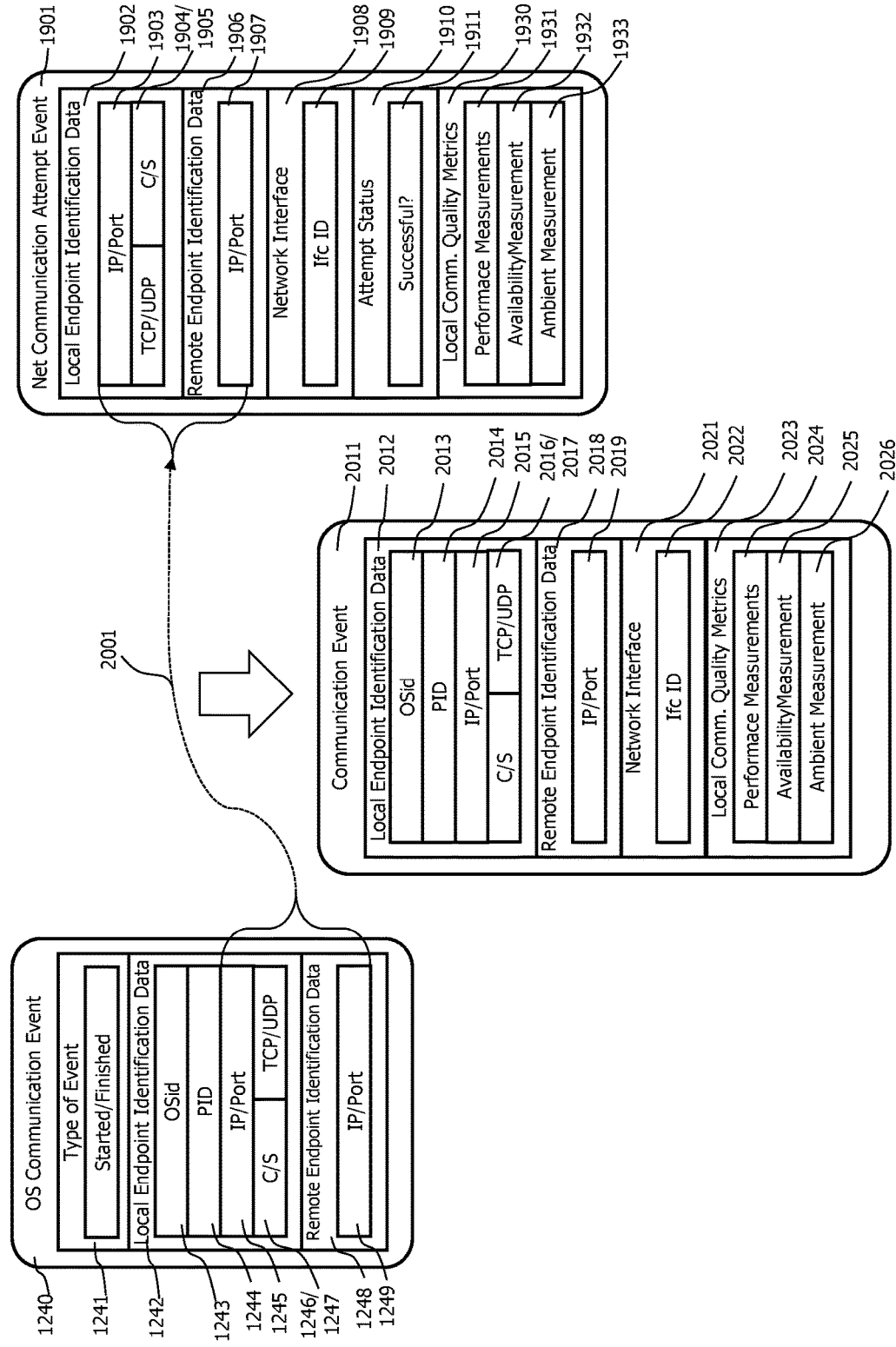
FIG 20: OS and Network Communication Event Correlation On Connection Setup

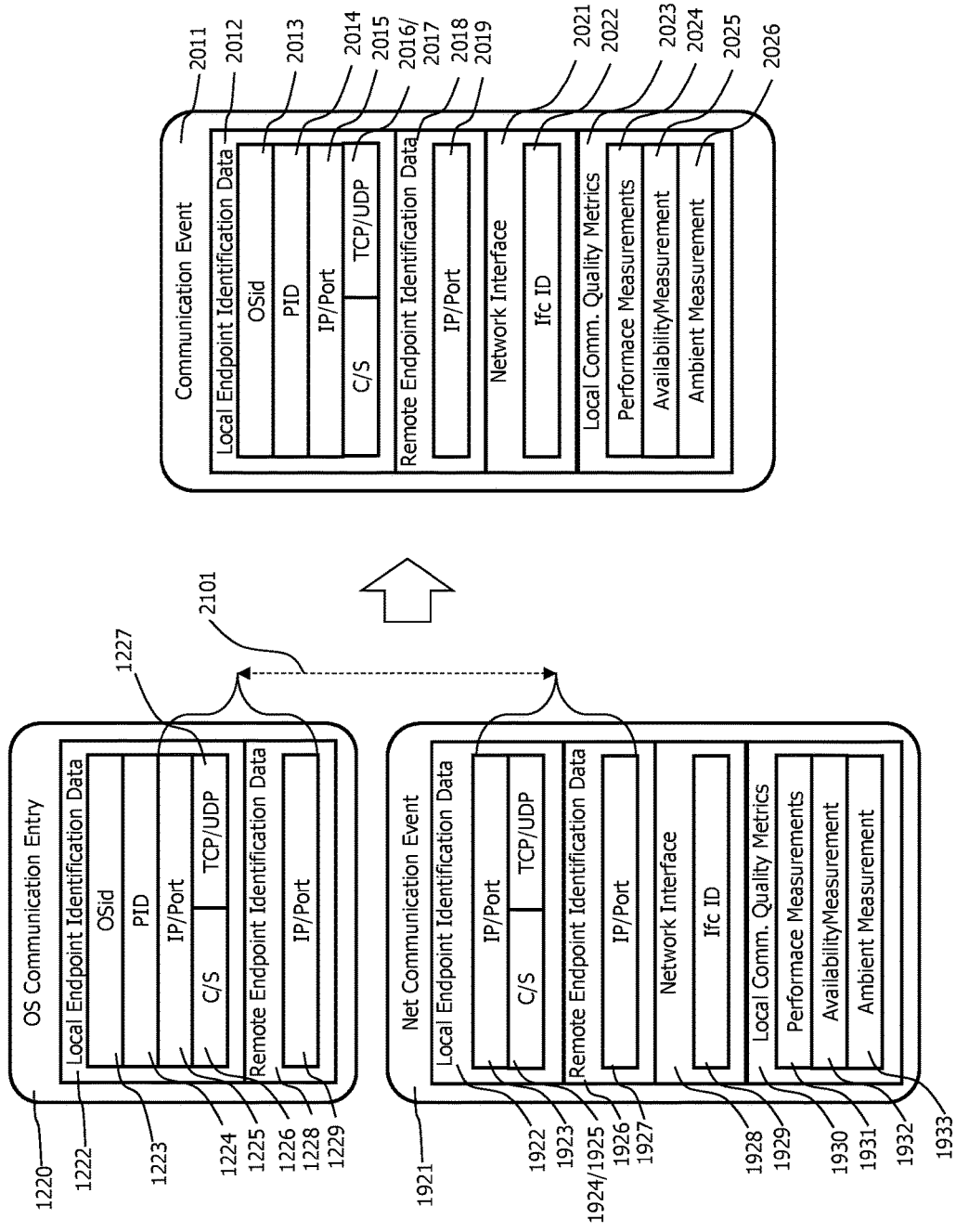
FIG 21: OS and Network Communication Event Correlation For Open Connection

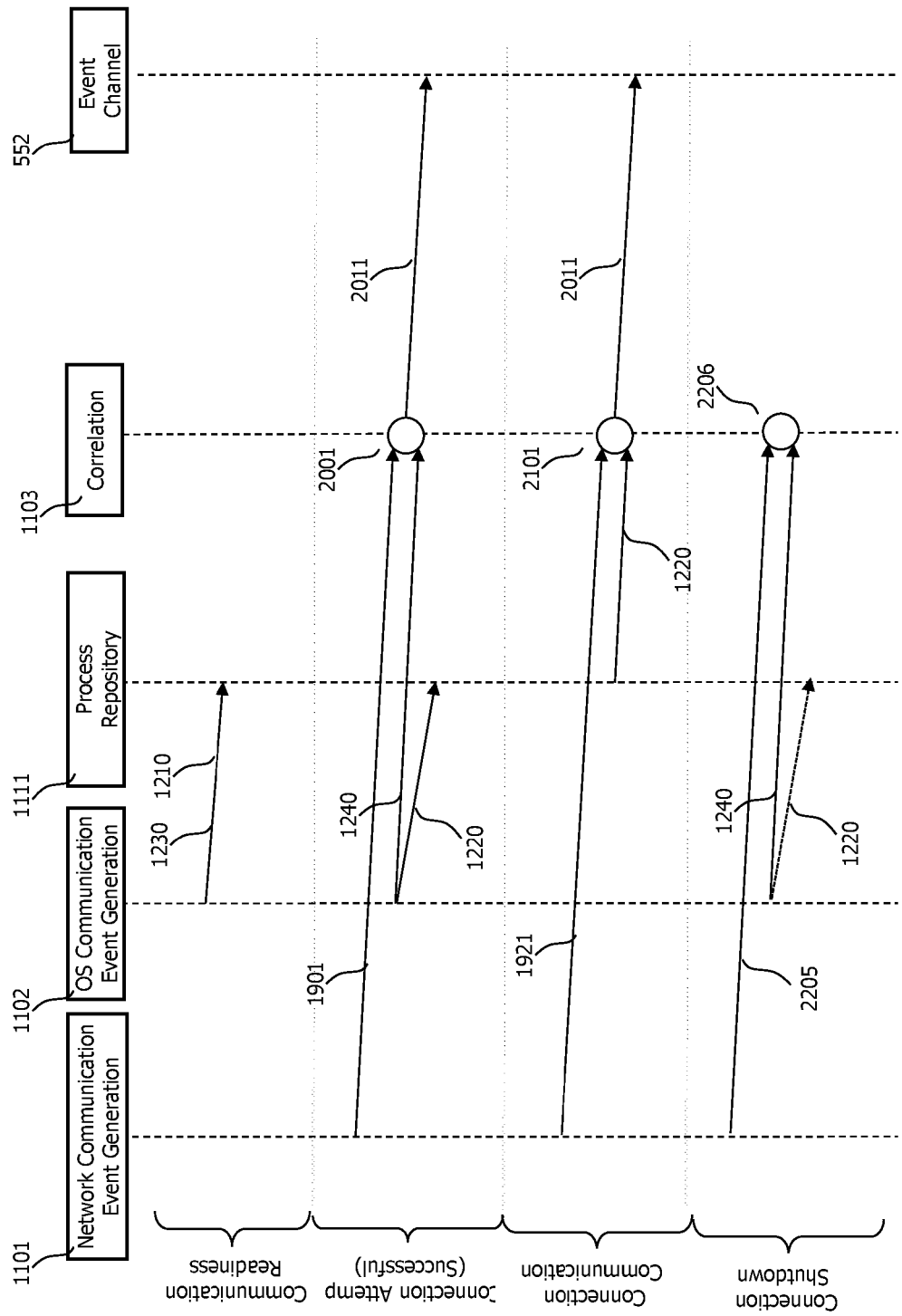

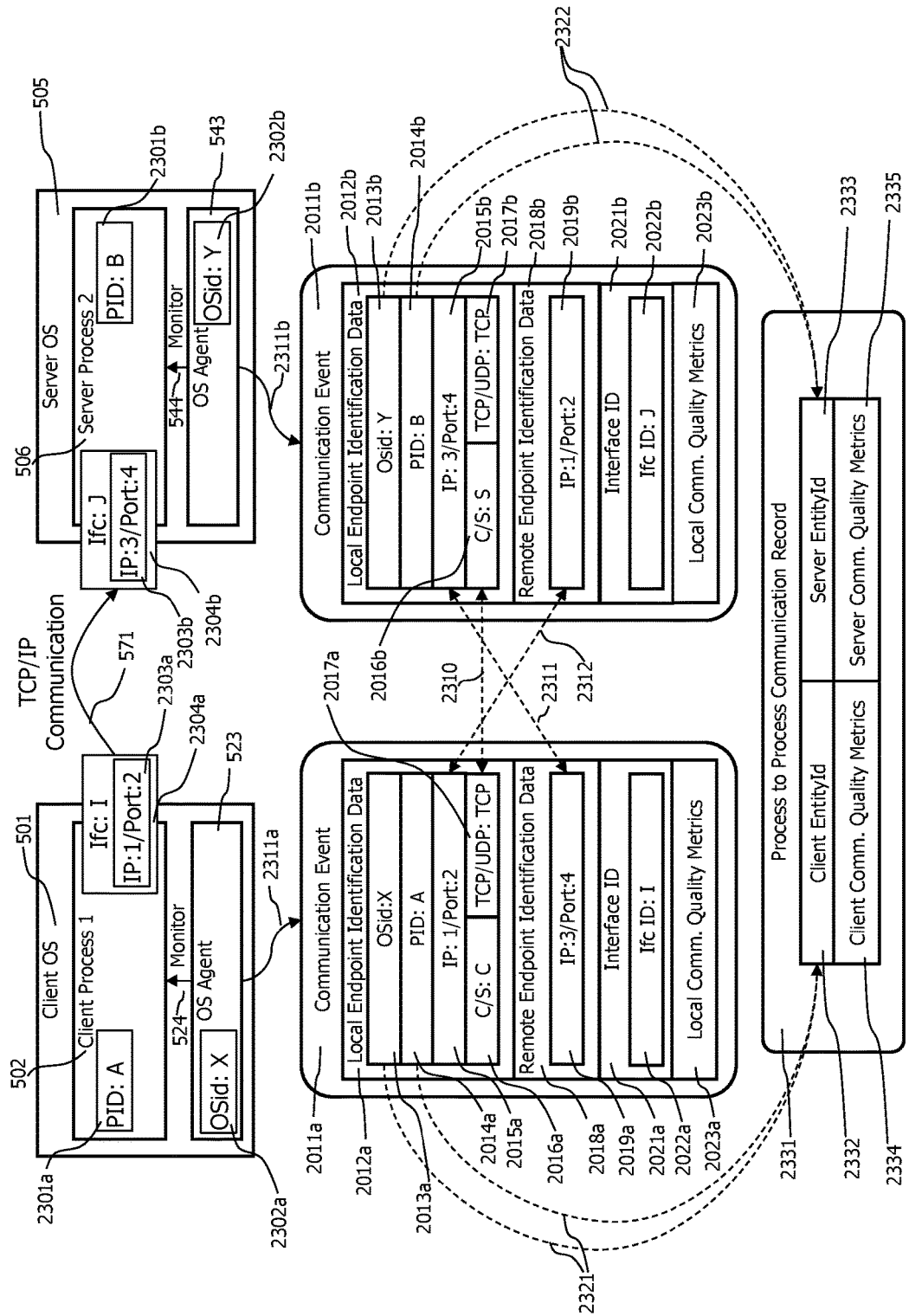

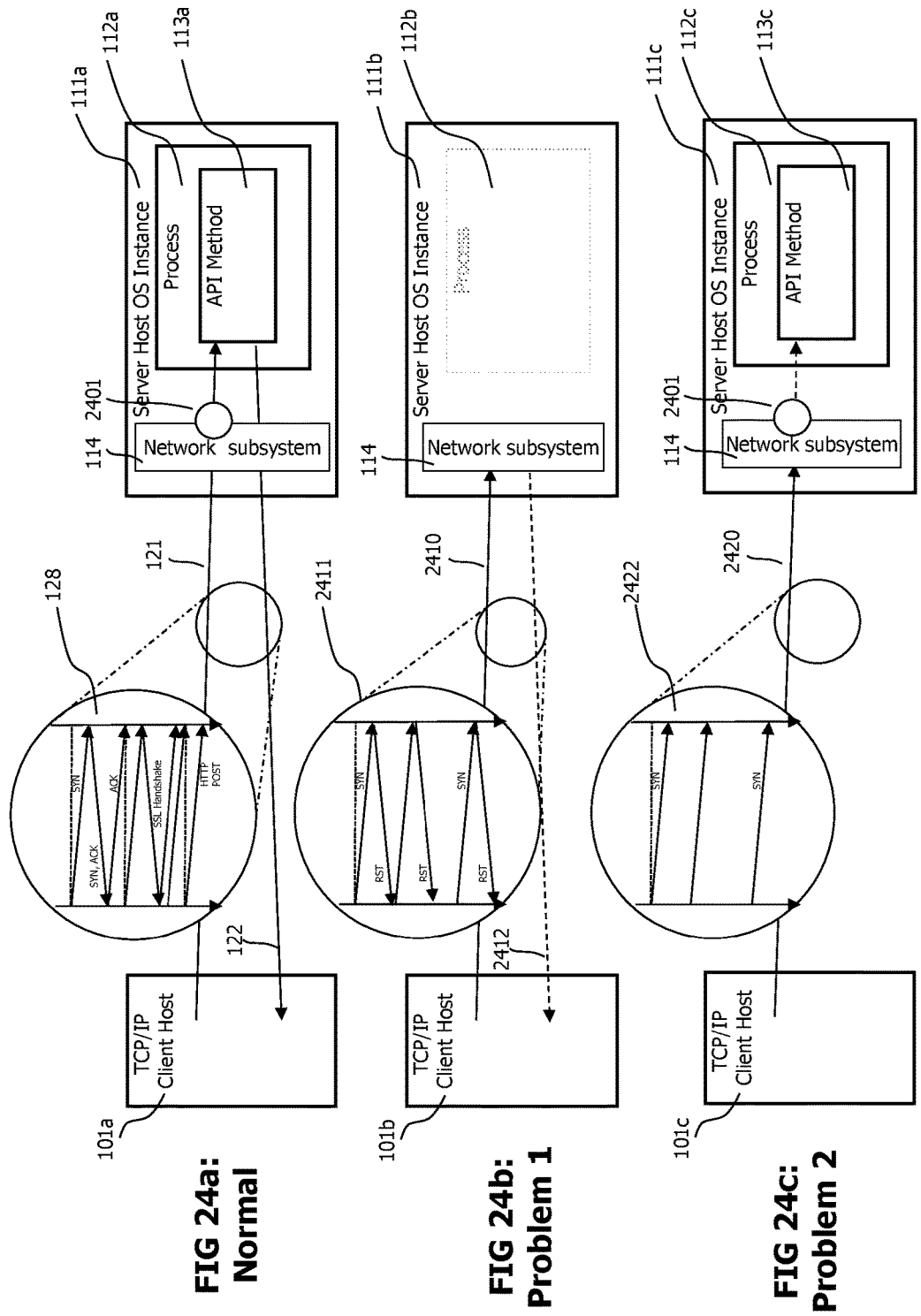

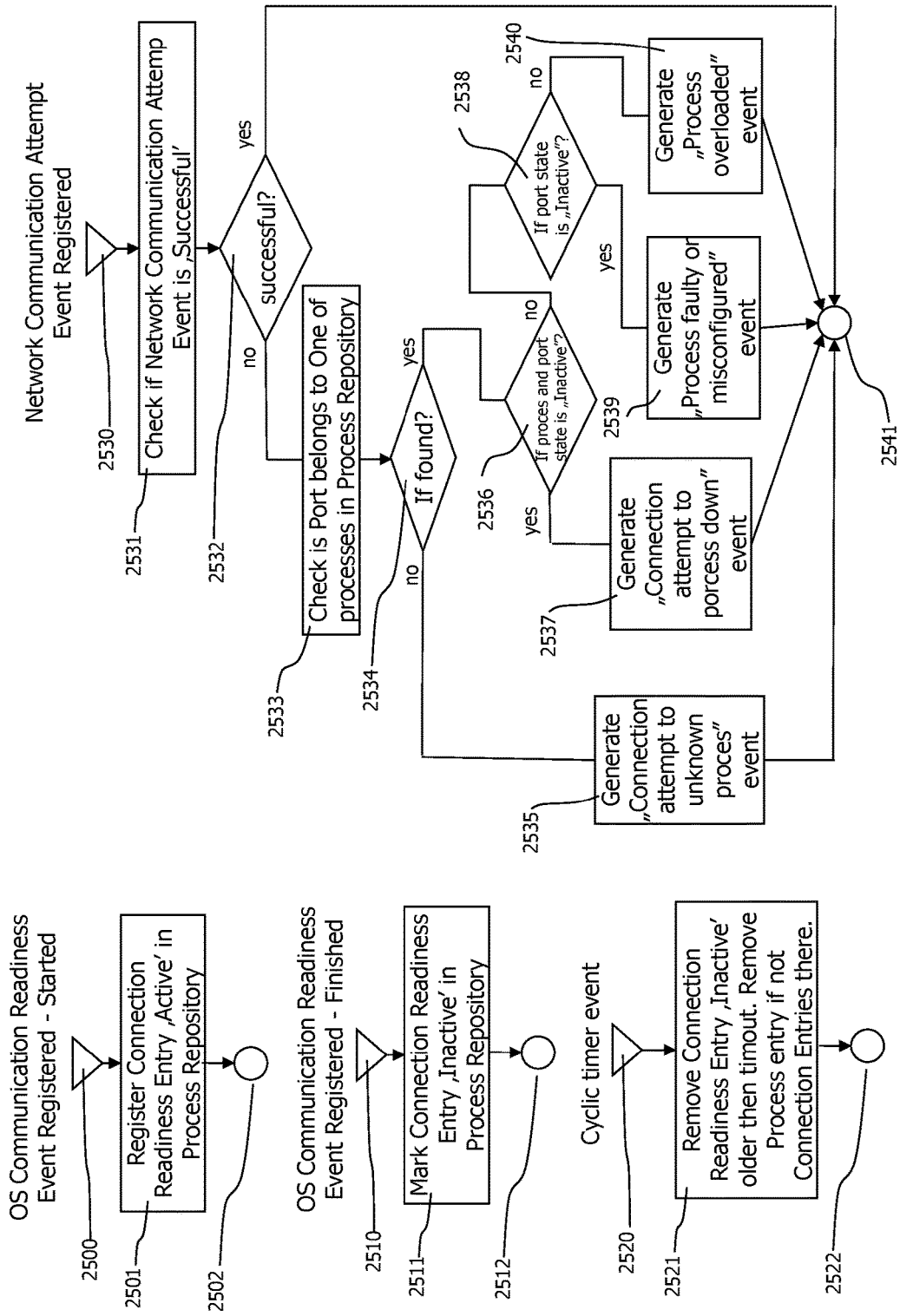
FIG 25: Detecting Dependency on the Failed, Stopped or Misconfigured Process

SYSTEM AND METHOD FOR MEASURING PERFORMANCE AND AVAILABILITY OF APPLICATIONS UTILIZING MONITORING OF DISTRIBUTED SYSTEMS PROCESSES COMBINED WITH ANALYSIS OF THE NETWORK COMMUNICATION BETWEEN THE PROCESSES

CROSS-REFERENCE TO RELATED APPLICATIONS

This application claims the benefit of U.S. Provisional Application No. 62/253,283, filed on Nov. 10, 2015. The entire disclosure of the above application is incorporated herein by reference.

FIELD

The present disclosure relates to the performance monitoring of overall communication between distributed system components and combining performance parameters describing the network communication with the topological relationships between processes.

BACKGROUND

Major design principles of modern, large-scale applications are modularity, service orientation and elasticity. This leads to applications designed as service oriented architectures (SOA) or microservices which are networks of intercommunication service providers, dynamically adapted to changing application load conditions. The advantages of those design principles are highly flexible applications, both in terms of functionality and in terms of scalability.

In such architectures, the processing performed by a single processing node decreases, whereas the communication between different processing nodes increases to provide the desired application functionality.

As a consequence, the computer network connecting the computer systems that provide the services gains importance and becomes crucial for the performance behavior of the application.

System monitoring solutions evolved over the years and in different staged of the development were extending their coverage and granularity of insight.

For example U.S. Pat. No. 6,070,190 A to Reps et al. for 'Client-based application availability and response monitoring and reporting for distributed computing environments' describes a monitoring solution of the system which focuses on response time monitoring and reporting the values vs service level agreed metrics. Such system is a source of information about what is the current (and historical) level of service with possibility to alarm on specific condition or change. Such system focuses on monitoring only and monitoring specific entireties only. In many cases checking the response time and availability happen in active manner, to artificially generated activity, not actual application operation. Such solution does not try to explain the reason of the underperforming operation.

Another U.S. Pat. No. 5,655,081 A to Bonnell et al. for 'System for monitoring and managing computer resources and applications across a distributed computing environment using an intelligent autonomous agent architecture' describes the agent based system which focuses on monitoring resources being a part or running on specific computer system. It also describes monitoring system aggregating gathered information in central node for storage and reporting.

U.S. Pat. No. 5,675,798 to Chang for 'System And Method For Selectively And Contemporaneously Monitoring Processes In A Multiprocessing Server' presents a monitoring system where the status of each client's application program, as it is reflected by a server process can be made available to the responsible person. The server process monitor program provides information to the network administrator at the granularity level of each of related client's process.

Current advanced server side performance monitoring systems, as e.g. described in U.S. Pat. No. 8,832,665 to Greifeneder at al. entitled "Method and system for tracing individual transactions at the granularity level of method calls throughout distributed heterogeneous applications without source code modifications including the detection of outgoing requests" or in U.S. Pat. No. 8,402,443 to Greifeneder at al 'Method and system for automated analysis of the performance of remote method invocations in multi-tier applications using bytecode instrumentation' which are included in its entirety herein by reference, are capable to provide tracing and measurement data for individual transactions, but have difficulty providing the visibility of the connecting computer network required to judge the performance situation of such massive distributed applications.

Besides such modern, service oriented or microservice applications, also traditional thin client/server oriented applications, like classical e-commerce applications as well as thin client applications like ERP software could benefit from a network side monitoring data. For such applications, the visibility gap would be closed between monitoring systems reporting browser side activities as e.g. the system disclosed in U.S. patent application Ser. No. 13/722,026 entitled "Method And System For Tracing End-To-End Transaction, Including Browser Side Processing And End User Performance Experience" which is included in its entirety herein by reference, and server side monitoring systems.

There are many metrics or key performance indicators which can characterize properties of computer network. Measurements like round trip time (RTT), latency, packet loss rate are measurable using different methods and used for different purposes. However just a measurement in context of the e.g. transit location in the computer network or even in context of recognized endpoints of the communication is not conclusive in term of influence of quality of communication processes on specific fragment of application infrastructure consisting of processes realizing specific functions by exchanging information over computer network.

Consequently, a method and system that overcomes the shortcomings of the current monitoring approaches and which is adequate for modern application architectures is required.

This section provides background information related to the present disclosure which is not necessarily prior art.

SUMMARY

This section provides a general summary of the disclosure, and is not a comprehensive disclosure of its full scope or all of its features.

Detection topology relationships between software and hardware components as described in U.S. patent application Ser. No. 14/879,183 entitled "Method and System for Real-time Modeling of Communication, Virtualization and Transaction Execution Related Topological Aspects of Monitored Software Applications and Hardware Entities" is a key step in monitoring distributed application and is incorporated in its entirety herein. It delivers information about relationships and dependencies between elements of distributed systems as well as dynamism of the environments as it can detect changes in the topology. What it lacks is information about the state of connections as well as quality of channel used to realize connection.

Exemplary embodiments of the present disclosure may be used to monitor and measure the extent to which the network communication problems between the application components may impair the overall end user experience. When determining the application performance problems and client user experience, it is insufficient to limit analysis to performance dependencies among application components, as the network communication problems between the components may impair the overall experience to a similar extent.

Some other exemplary embodiments of this application may be capable of observing the network communication and especially the change in network communication patterns and as the result allow to point the underperforming elements, indicate the time of the failure as well as verify if the remediation actions were successful.

Yet other embodiments may be capable of discovering communication attempts addressed to failing or underperforming application components through monitoring the network activity around specific distributed application components.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a block diagram depicting a distributed application and its components, describes dependencies between components of distributed application and explains the influence of network communication quality and conditions on total execution time of the exemplary transaction.

FIG. 2 is a diagram of an example of packet exchange scenario between client and server using TCP/IP protocol stack to execute simple remote call: a webservice call over secured (HTTPS) channel from TCP session establishment, through securing channel, authentication, proper data exchange to TCP connection shutdown. Additionally, it shows internals of communication to emphasize complexity of the process and susceptibility to quality problems in packet transmission.

FIG. 3 is a diagram that explains, on the example, the influence of packet transport latency on duration of particular phases as well as total execution time of exemplary remote call. It shows the comparison and change between communication happening in optimal conditions and the communication in non-optimal conditions.

FIG. 4 is a diagram that explains, on example, the influence of packet loss (or packet corruption leading to packet rejection) on duration of particular phases as well as total execution time of exemplary remote call. It shows the comparison and change between communication happening in optimal conditions and the communication in non-optimal conditions.

FIG. 5 is a block diagram of an architecture for a monitored distributed application, architecture of the monitoring system and its components, dependencies between monitoring system components as well as dependencies on OS build-in functions curtail to perform used to realize distributed application functions and to implement monitoring system aware of network communication quality aspects. This variant of monitored system architecture and implementation is dependent on internal OSes tables/repositories of open TCP/IP connections and TCP/IP connection relationships to the processes.

FIG. 6 presents variant of the monitoring system with partial installation of monitored agents limited to instrumentation only the server side of the application.

FIG. 7 is a block diagram showing architecture of the monitored distributed application, architecture of the monitoring system and its components, dependencies between monitoring system components as well as dependencies on OS build-in functions used to realize distributed application functions and to implement monitoring system aware of network communication quality aspects. This variant of monitored system architecture and implementation is dependent on interception of OS APIs and/or standard library calls being used by monitored process to establish, use and shutdown connections transporting requests and responses between components of a distributed application.

FIG. 8 describes exemplary, but very typical operating system's and/or OS network subsystem, their content, entry types and their relationship to processes relying on communications with others.

FIG. 9 is a diagram explaining interaction between server process, network subsystem and the OS data structures: connection and handle tables. This figure also shows interactions which can be intercepted as well as interactions which result in sending network packets or are results of received network packets that can be analyzed by network agent.

FIG. 10 is a diagram explaining interaction between client process, network subsystem and the OS data structures: connection and handle tables. This figure also shows interactions which can be intercepted as well as interactions which result in sending network packets or are results of received network packets that can be analyzed by network agent.

FIG. 11 presents architecture of operating system agent using OS data structures to track communication. It explains the block diagram relationship between operating system agent, monitored processes and OS network communication logic with data structures controlled by this logic. This figure also shows data and event flow finally resulting in generation of OS communication events with all operating system agent elements and OS input data sources relevant in generation of such events.

FIG. 12 visually shows formats of events generated as a result of periodical observation of internal OS data structures related to network communication.

FIG. 13 is a flowchart explaining algorithm used to translate observed changes in the OSes into events correlated with actions taken by monitored processes or actions such as accepting incoming communication triggered by external circumstances. This algorithm defines the key element of output events and changes to the state of the agent and state of processes and connections tracked by the agent.

FIG. 14 presents architecture of operating system agent using interception method and events generated by intercepted communication API calls together with in-process agent. It explains the block diagram relationship between intercepted APIs, in-process agent, operating system agent, monitored processes and OS network communication logic. This figure also shows data and event flow finally resulting in generation of OS communication events with all the operating system agent elements and OS input data sources relevant in generation of such events.

FIGS. 15A-C shows OS communication readiness event data structure sourced from interception code executed on a call of this intercepted API. It explains when specific information describing a process and identifying an operating system is added to make the event more meaningful and precise.

FIGS. 16A-C shows OS communication event data structure sourced from interception code executed on call of this intercepted API. It explains when specific information describing a process and identifying an operating system is added to make the event more meaningful and precise.

FIG. 17 presents block diagram of network agent and its attachment to OS component providing packet feed as well as an output leading to operating system agent. Blocks inside of network agent and their relationships show data flow starting from raw packets, through tracked TCP connection to sets of network relevant measurements describing quality of communication.

FIG. 18 is a diagram illustrating TCP connection packet exchange leading to establishment of reliable connection together with event generated inside of network agent depending on the result of the opening sequence.

FIG. 19 shows event definitions related to communication attempts (successful or unsuccessful) or just ongoing communication. Picture differentiates values identifying connection endpoint characterization from sets of measured data.

FIG. 20 explains the correlation between OS Communication Event generated on connection setup by operating system agent with successful Network Communication Attempt Event generated on connection setup by network agent.

FIG. 21 explains the correlation between OS Communication Entry stored by operating system agent in Process Entry in Process Repository with Network Communication Event generated by network agent.

FIG. 22 explains the relationship between correlating logic and sources of event as well as available data repositories. It also shows how events affect data repositories and when subsequent level events are generated.

FIG. 23 visually describes the process of correlating process communication activities reported by different operating system agents describing the endpoints of the communication activities to create corresponding horizontal relationships of the integrated topology model describing a communication between processes together with all relevant communication quality metrics.

FIGS. 24A-C explains examples of process availability problems in context of distributed application such as process crash, process down-time or process misconfiguration, fault behavior or overload leading to not accepting new connections and service requests together with different symptoms of such situation visible in the TCP packet exchanges between client and network subsystem of server host OS instance.

FIG. 25 describes algorithm of qualifying Network Communication Attempt Event to current knowledge about the process states and translating them into meaningful events describing the process state and impact of process failure or misconfiguration on the depending parts of distributed application.

Corresponding reference numerals indicate corresponding parts throughout the several views of the drawings.

DETAILED DESCRIPTION

The described embodiments are directed to the view of topology relationships between processes being part of distributed application equipped with the rich set of information related to the quality of communication. Presented solution combines topological aspects of relationships with measurements taken for specific communication channels at the level of physical network traffic. While topology can be discovered at the level of processes, the interactions with operating system means allowing tracking of communication and relationships, the quality of communication, the completeness of communication, which requires a deeper level of insight.

All network quality measurement require access to actual packets transferred over the computer network, analysis of flow control information contained in the headers of the packets and understanding of the protocol data formats and state transitions. The important element is the understanding of rules which governs the influence of network conditions to application response times.

Collection of the packets for the analysis in the method described in the disclosure happens on the system playing the role of the host for application components being the server for other parts of application (clients) or end users of the application, being the client to other servers as well as being the server to other clients or just being the client to other servers. Such approach does not require installation of any network probes like described in U.S. Pat. No. 5,878,420 to de la Salle titled 'Network monitoring and management system' used as autonomous entities and main source of information or in U.S. patent application Ser. No. 14/227,597 titled 'System And Method For Combining Server Side and Network Side Transaction Tracing And Measurement Data At The Granularity Level Of Individual Transactions' where network probe provides supplementary information to results of analyzed transactions. The advantage of software only approach (vs. use of dedicated hardware) is that it can be successfully used in environments where it is impossible to gain access to physical network from packet collections like public clouds and where it is very difficult to gain access to physical network like in private clouds or software defined data centers. Two additional advantage of this method is proximity of both operating system data analysis and network data analysis outputs, as both operate on a single host in integrated agent environment.

Key aspect of the innovation is a correlation of communication activity visible on the process level concurrently with activity on the level of network communication. Embodiments below will now be describing more fully the method and system with the reference to the accompanying drawings.

Referring now to FIG. 1, which conceptually describes a network communication and potential influence factors on the performance of such a network communication. Typically, such a network communication is initiated by a client process 102 residing and running on a client operating system instance 101. The client process 102 creates a request 121 directed to a server process 112 running on a server operating system 111. The request 121 is handed over to the network subsystem 103 of the client operating system 101.

The network subsystem 103 receives the request and interacts with a computer network 104 connecting client and server operating system instance to transfer the request to the server operating system. A network subsystem 114 residing on the server operating system instance 111 interacts with the computer network 104 to receive the request 121, identify the server process 112 addressed by the request, e.g. by fetching the TCP port to which the incoming request was directed and comparing it to the TCP ports on which the server process 112 is listening for incoming requests, and forwarding the request to the server process 112 which handles the incoming requests 121 in an API method 113. Processing the incoming request by the API method may, in addition to local processing, contain sending one or more requests 115 to other processes on other operating systems (not shown) and receiving and processing corresponding responses 116.

The API method 113 processes the incoming request 121 to create a corresponding response 122, which is forwarded to the network subsystem 114 of the server operating system instance 111 which interacts with the computer network 104 to transfer the requested response to the client operating system instance. The network subsystem 103 of the client operating system 103 receives the response and forwards it to the requesting client process 102 which may further process the response.

The processing of requests and responses performed by the network subsystems 103 and 114 and the network may include splitting request and response data into packages capable to be sent over the network, re-assembling those packages to reconstruct the sent request or response data, assuring the correct transfer of those packages, potentially causing the resend of packets, establishing, securing and closing a network connection between sender and receiver. See e.g. the packet transfer sequence diagram sketch 128, or the detailed packet transfer sequence to exchange a HTTP request and response shown in FIG. 2.

All those processing steps performed by the network subsystem and the network are typically hidden from the processes involved in the communication. However, they have a great influence in the performance and response time 123 perceived by a client process, as shown by the breakdown of the request processing duration 124. In general, the time to produce and deliver the requested response is divided into time required to transfer request and response data from client to server or communication duration 125, time required to process the received request by the receiving process 126, and time required to perform tasks delegated by the receiving process to other processes, e.g. next tier processing time 127.

As mentioned earlier, the communication duration 125 is split up into time required to negotiate and establish a communication channel between the communication partners, split the request and response data into packets that may be sent atomically over the network, and reassembling the receiver side, as indicated in 128. In case the conditions of the connecting computer network change 130, the communication duration may increase 131, but the other components of the total response time, like service processing time and next tier processing time remain the same.

A monitoring system that only monitors timing data at the communication endpoints, would show a degradation of response time visible at the client process, but would show no corresponding increase in request serving time on the server time. Such a monitoring system may in such cases identify the network as potential root cause of the performance degradation. But, as shown later, there are multiple reasons that may cause a degradation of network performance, all of them require different countermeasures. A monitoring system not observing the network activities caused by the network communication could not provide data to help identifying the best matching countermeasure to fix the performance problem.

Referring now to FIG. 2, showing a sequence chart that conceptually illustrates the network packet level view of a network communication by the example of a HTTP POST request and the corresponding HTTP response.

The network communication is triggered by a TCP/IP client 201, which sends a SYN packet 211 to initiate the creation of a TCP session with the TCP/IP server 202. The server 202 responds with a SYN ACK packet 212 which is received by the client 201 which acknowledges the SYN ACK packet by sending back an ACK packet 213 back. After the server has received the ACK packet, the TCP session between client and server is established. The time between sending the first SYN pack by the client 201 and receiving the second ACK packet by the server 202 is also called TCP Session establishment time 210. After the basic TCP session is established, client and server may optionally negotiate a security session like e.g. a SSL session, which requires the exchange of SSL handshake and negotiation 222 packets between client and server. The time between start and finish of the SSL session is called SSL session establishment time 220.

Afterwards, an optional HTTP Authentication phase 230 is performed, in which the client first sends a packet containing authentication data 231, which is answered by the receiver with a packet containing the authentication result 232. After those preparation steps of the network transaction are finished, the client starts sending packets containing the request data 241 which are received by the server. The time elapsed between sending and receiving the request packets is also called request time 240. After the server received all request packets 231, it starts analyzing the request and creating the corresponding response. The time required to perform these activities is also called server processing time 250.

The response is split into response packets like e.g. 261, 262, 264 and 265, which are sequentially transferred from the server to the client. After a specific amount of transferred response packets, the client acknowledges the correct receiving of the packets by sending an ACK packet 263 or 266 back to the receiver. The server continues sending remaining response packets after receiving an ACK packet. After all response packets have been transferred successfully and acknowledged by the client, the server sends a first FIN packet 271 to signal a finished network transaction to the client, which acknowledges it by returning a second FIN packet 272. Sending of the FIN packets also tears down the TCP session. The time required to signal the end of the transaction and to tear down the connection is also called TCP session closure time 270.

The possible impact of the increased network latency on the performance of a network communication is shown in FIG. 3. Increased network latency may e.g. occur if a physical high-speed network connection is disconnected or unavailable and network packets need temporarily be routed using a slower physical connection.

The left part of the figure shows an unaffected communication event and the packet traffic caused by the communication, whereas the right part of the figure shows an equivalent network connection affected by the increased network latency.

In both cases, the communication starts by a TCP/IP client 201 and 201*a* sending network packages representing a HTTP post request 231 and 231*a* to a TCP/IP client 202 or 202*a*. In case of the affected communication between client 201*a* and server 202*a*, the time to transfer the packets representing the HTTP POST request 231*a* to the server 202*a* is increased, compared to the unaffected communication event. As no performance problem is occurring on the server process receiving and processing the request to create a corresponding response, the server processing time 302 does not affected and remains unchanged.

After the corresponding HTTP response is created, the delivery of the packets representing the response 261, 262, 264 and 165 (in affected case 261*a*, 262*a*, 264*a* and 265*a*), and the packets to acknowledge the successful receipt 163, 166, 163*a*, 166*a* of the request is delayed compared to the communication event unaffected by the increased network latency. As a consequence, the overall response time observed at the client 201*a* is increased (request time component 301 and response delivery time component 303), whereas the server processing time observed at the server 202 or 202*a* remains the same (302).

Coming now to FIG. 4 which illustrates the impact packet loss may have on a network communication. Data may be corrupted on its way through the network by various physical effects, e.g. caused by weak physical network connections. Typically, network communication protocols provide features that allow to reconstruct partially corrupted data to avoid resending of network packets. But in case the corruption of the received packet data increases a certain level and the corrupted data cannot be regained, the packet is considered lost and a retransmit is requested by the receiver. Packet corruption can be also detected on its way from the source to destination by one of the network devices responsible for forwarding packet to right destination. In such case, the packet will be discarded by such device and never reach its destination. Loss of packet can also happen in any of network devices on the way. It may happen due to e.g. queue overflow or other resource shortages.

Again, the left part of FIG. 4 shows an unaffected communication event and the right part shows a communication event affected by a packet loss.

As it can be seen in FIG. 4, the time required to transfer network packets between unaffected client 201 and server 202 and the affected client 201*b* and server 202*b* remains the same.

However, on sending the HTTP POST request from affected client 201*b* to affected server 202*b*, a packet loss 411 occurs, and sending the HTTP POST request is delayed by the time 412 required to detect on the server 202*b* side that the payload data of packet was not delivered and perform a retransmit 413 of the corrupt data. As in the earlier example, the server processing time 402 is not affected and remains unchanged.

After the request has been processed on the server side 201/201*b* and response data is available to be transmitted back to the client 201/201*b*, transmission of the response starts with sending a first response packet 261/261*b*. However, in the packet loss affected communication event, the second response packed 262*b* is lost 421, and the acknowledgment 422 is the acknowledgement for packet 261*b* only. With the arrival of packets 263*b* and 254*b* client realizes that a packet is missing and besides acknowledgment of them in packet 423 request to retransmit this packet 421. Request is answered by a retransmit 424 of the lost packet. Now the transfer is complete.

As a result, the total response time perceived on the client 201*b* is increased, compared to the unaffected communication event.

FIG. 5 shows the overview of a monitoring system deployed on both ends of the communication, Client function 503 and Server function 507 with the Monitoring Node 560 correlating data retrieved at both ends. Client side is instrumented with operating system agent 523 and network agent 521 and similarly server is instrumented with analogous operating system agent 552 and network agent 541, but neither of the parties have insight into the System API calls between the process and OS. Client establishes connection 571 over communication network 570 which is bi-directional channel able to transport request 572 from client function 503 to server function 507 as well as responses from server function 507 to client function 503 running inside of processes 502 and 506. Having access to the client side network subsystem 504 and server side network subsystem 508 and ability to configure network subsystems to copy network packets used to carry information over channel 571 and forward them (522 and 542) to network agents (respectively 521 and 541), network agents at both sides can analyze the network raw communication. They can identify the connection endpoints and measure the connection quality, and pass this information to their respective operating system agents. Analysis of raw communication units (packets, datagrams) exchanged between parties as well as observation of timings between subsequent or corresponding communication units is the only way to judge the quality of end-to-end communication when monitoring system has only access to operating system software running on monitored host. Similar network relevant information can be discovered by network probe located somewhere on the way of packets between OS instance 502 and 505, but not in higher layer of data transport and communication APIs used by processes being part of distributed application. Additionally, agents on both ends of the communication observe the OS internal data structures (511 and 531) and can match the connections identified by the network agents with the processes. This is achieved by utilizing information retrieved from the client side OS Process-Network Binding Tables 511 and server side OS Process-Network Binding Tables 531 updated (512, 532) by Network Subsystem every time processes like depicted process 502 or 506 open new connection, accept new incoming connection or declares readiness to accept new connections. This way, the operating system agents on both sides of communication, combine the records retrieved form OS internal structures with data retrieved by their respective network agents and use the communication channel on client side 551 and server side 552 through the event channel client side 553 and event channel server side 554 respectively to pass the combined records to central monitoring node. Monitoring node can use the data retrieved at both sides of the communication to perform the event and metrics correlation 561, which results in obtaining related statistics, events and objects 562, which in return become the base for data analysis and visualization 563.

Method of obtaining 525 and 545 information from OS process-network binding tables can be realized via different strategies. Operating system agents can utilize polling to retrieve information related to OS internal data structures. In this mode, operating system agents read the whole content of the data structure 511 or 531 periodically and observe changes in the data structure which are related to connection establishment, connection shutdown or declaration of readiness to accept connections. Alternative method for operating system agent component 523 is to register into Network subsystem or any other part of the OS responsible for maintaining this data structure and receive notifications on changes in the OS data structures or other notifications carrying relevant information. The shortcoming of depending on polling is that it may exclude identification of very short living connections which lasted shorter then polling interval.

Operating system agent and network agent are kept as separate entities due to security reasons. Network agent drops admin privileges to be less vulnerable from uncontrolled data input, which in this case is the raw network packet stream. On the other hand, operating system agent requires admin privileges to have access to particular data structures. Depending on particular security constraints, both OS and network agents could be combined into a single entity if it did not impose threats on the overall security of the solution.

FIG. 6 depicts the example overview of the monitoring system missing the instrumentation on client side OS Instance 601. Network Agent 541 monitoring the incoming and outgoing connections on the server side is still capable of providing data sufficient to calculate the connection quality and correlate the connections with the server side processes. Although this deployment option will not be capable of binding the client side processes (host network address will still be known) with identified connections, one end only instrumentation is still capable of providing insightful monitoring data for the monitoring node analysis. Very similar situation will occur when agents are placed on client side only. It is enough to measure connection quality, but binding to server process will be missing. With this limitation, in such scenario server service can be characterized by both server network address and TCP port.

FIG. 7 presents the overview of the monitoring system where an alternative method is used to retrieve information about the process network and communication related activity on both ends of the communication. OS instances 501, 505 are capable (by proper configuration) to instrument processes running on them by injection of in-process agents 704, 714. In-process agent is a library with the entry points mimicking those of the OS and standard libraries, which provides them with System API intercept 702,712 capabilities that enable it to intercept both request and response of the OS and standard libraries API Calls. Binding the parameters intercepted through the process API communication with the network connections identified by the network agents 521, 541 enables the operating system agent to be aware of all opening and closing connections, even the shortest living ones. The fine granularity of intercepting connections requires much more frequent agent invocations and may cause unwanted overhead from the monitoring system, yet with efficient implementation and if high precision is required, this method can become acceptable.

FIG. 8 demonstrates a detailed example based on the actual Linux operating system. It lists the relationships between processes 861 and 862 and entries of OS Resource Handle Table 841 and OS Network Connection Table 801. Process P1 861 owns two connections. It controls them via system assigned resource identifiers—handles. The relationship of ownership is recorded and remembered by operating system in entry 842 in OS Resource Handle Table 841. Each entry 842 host handle 851 uniquely identifying resource and process identifier (PID) 852—a number which uniquely identifies process within this operating system. Process identifier holds entries defining relationship 863 between each entry and corresponding process being an owner of it. Separate table, OS Network Connection Table 801 holds detailed information about each individual network connection in separate entries 802. From network protocol perspective, such entry has to contain local IP address 814 (or any other address if other network protocol is used) terminating this side of the connection, remote IP address 813 (or any other address if other network protocol is used), indication of transport protocols used 816 (TCP or UDP in this case), role of this endpoint in context of this connection 815: being client or being server, local port 818 identifying this particular connection on the transport level protocol on local side and remote port 817 identifying this particular connection on the transport level protocol on remote side. Network connection entry contains state field 811 describing state of the connection like the actual step of connection establishment process as well as connection shutdown process. Handle identifier 812 in each entry from OS Network Connection Table 801 has corresponding record in OS Resource Handle Table which creates relationship 831. This picture shows how to find connection between particular process like process P1 861 and OS data structures.

Same data structures are used when process like process P2 862 declares readiness to accept connections. Process P2 862 owns handle in OS Resource Handle Table 841 and has similar relationship with it 865. OS Network Connection Table 801 also contains information about such s fact in dedicated entry 820. Because it only declares readiness to accept connection, such entry does not contain any remote endpoint information. It only contains local IP address 823 accepting connections, indication of transport protocol which can be accepted 825 (TCP or UDP in this case) and local port 826 identifying this particular connection on the transport level protocol on local side. Role of such entry can be only set to 'serve' 824. Network connection entry also contains state field 821 which describes status of the readiness. Handle identifier in such entry from OS Network Connection Table 801 also has corresponding record in OS Resource Handle Table which creates relationship 832.

Using identifiers like handles 812, 822 or 851 as well as process identifiers (PID) 852 allows to track relationships between process and opened network connections. While the concept has been described in relation to a particular operating system, it is understood that the broader aspect of this disclosure is applicable to other types of operating systems as well.

FIG. 9 presents the patterns in server process 506 interaction with the network subsystem logic 901 and network 570 that enable the monitoring system to identify particular connection states, both with and without the in-process agent instrumentation 508.

The connection readiness is initiated by the server process 506 executing code 911 notifying in call 912 Network subsystem logic 901 that it should await connections on specific port. The code 913 executed inside Network Subsystem logic 901 generates updates 914 and 914 making this process identification available in the OS Resource Handle Table 841 and in the OS Network Connection Table 801 by creating there entries 915 and 917 respectively. This is declaration only of readiness to accept incoming connections so it is missing any remote endpoint information. The same call 912 can be intercepted (961) using the in-process agent 704 and system API interception code 702. Intercepted call parameters carry similar set of patterns enabling the monitoring system to identify the connection readiness. Monitoring system does not observe any network interface activity, no packets are sent and captured.

When a remote connection 920 reaches the network subsystem 901, network subsystem logic code 921 is executed and the TCP/IP three-way handshake 926 necessary to start is performed. The request-response exchange enables the monitoring system to observe packet exchange through packet copy process 902 and reserving the resources resulting in appearance of process identification 923 in OS Resource Handle Table 841 and a complete entry 925 in OS Network Connection Table 801 via proper update 922 and 924 issued while executing network subsystem logic code 921. This time entries contain remote endpoint network identification details including remote IP address and TCP port. The remote end network identification details can be also retrieved in packet captured (902). Intercepting (926) the internal API notification 927 is also sufficient to identify the accepted connection state. Once the request response exchange commences 930 935, handled by network subsystem code 931, 934 respectively and during the data transfer to/from process code 928 via notifications (932) and calls (933), the monitoring system will not observe any interaction with the OS data structures, however the copied packets (902) carry the remote party network identification details that enable the monitoring system to attribute them to the identified connection.

Monitoring system is able to observe the ending of connection readiness by identifying the pattern where the process 940 notifies 941 the network subsystem to close the port, which results in removing related entries from the Network Connection Table 946 and releasing the resources from OS Resource Handle Table 944 via generated updated 945 and 963 respectively by network subsystem code 942. Intercepting 963 the internal API calls is also sufficient to identify the ending of connection readiness.

Failed connection attempt is visible neither in the system data structures, nor through intercepting the internal API calls, as the pattern is handled exclusively by the network subsystem code 951. With the insight into network identification details carried by the packets, the monitoring system is able to observe a connection attempt 950 (TCP packet with SYN flag) to a closed port, and also can see optional failure notification 952 sent in TCP packet with RST flag. Such notification is optional, dependent on network subsystem configuration. In the case that such notification is not issued, monitoring system can detect such situation, by ensuring that any valid data communication is not held on connection identified by same source/destination address (IP address, TCP port) in connection establishment.

FIG. 10 presents a similar set patterns used by the monitoring system to identify the connection states, but this time at the monitored client end.

Connection attempt is initiated by the process code 1001 sending a call 1002 to network subsystem 901. Code 1005 starts the request 1003 responded with response 1004 from the remote end. If connection attempt is successful, the data structures (Network Connection Table 801 and Resource Handle Table 841) are updated by corresponding updates 1006 and 1007 issued by network subsystem code 1005 with entries related to process identification 1007 and network connection identification 1009 carrying the information on the remote connection end.

Interception 1041 of the call 1002 is also sufficient to provide all needed identification of network connection as described in new entries 1007 and 1009 appearing is OS data structures 801 and 841.

Set up connection can be now used to transport request 1011 and receive response 1016 from and to application code 1001 of client process 502. Network Subsystem logic handles outgoing request by executing code 1012 and transforming application request data 1011 to corresponding network packets 1013. Similarly, incoming response packets 1014 are handled by code 1015 of Network Subsystem Logic and transformed to response 1016 understood by client process. Communication 1013 and 1014 utilizes same identification as stored in entry 1009.

Closing connection commences with the process call 1021 to the network subsystem resulting in the execution of code 1022 and packet exchange 1023, 1024 with the remote end confirming the connection close, which is reflected in the system data structures by removing related entries 1028 from the network connection table with update request 1027 and releasing the resources 1025 from OS Resource Handle Table 1026. Intercepting the internal API calls 1042 is also sufficient to identify connection tear-down.

Unsuccessful connection attempt commences in a regular way by a call from the process to the network subsystem to initialize the request 1033 response exchange with the remote end. The attempt might be instantly rejected 1034 or no response might be returned within the timeout period. In both cases, no data structures are involved and the pattern can be identified only through capturing the packet exchange or through intercepting the API calls 1043 and API notification 1044 between the process and network subsystem. Capability to observe this pattern enables the monitoring system to monitor the performance of the remote application even though the communication and activity on the remote end is not recorded.

FIG. 11 explains the operating system agent 543 architecture and its role in correlating relationships between operating system agent, monitored processes 506 and OS network communication logic 901 and data structures available in OS Network Connection Table 801 controlled by this logic as well as data from OS Processes Handle Table 841. The scenario presented assumes that operating system agent relies on polling the system data structures without the in-process agent instrumentation. Operating system agent polls the data structures in the context of Operating System Kernel 1121. The structures are stored in OS Processes Handle Table and OS Network Subsystem. Through each polling attempt performed at a configurable interval, the operating system agent is able to read the current state of attributes 851,852, 812, 815, 814/818, 813/817 constituting multiple entries 842, 802 stored in the tables. The OS network subsystem 508 applies the Network Communication Logic 901 to control the communication exchange 571 with the network 570 through the Communication Interface 1126 as requested by the processes 506. Network related actions requested by the processes result in the attribution 1125 of network identification details 1124 and creating related entries in the OS Network Connection tables supplemented with resource identification 812 which can later be used to bind the connection with processes. Due to the nature of polling, Cyclic OS Information Acquisition 1107 performed by the operating system agent, provides information on current state. To observe changes, the operating system agent creates the Process Repository 1111 that stores the entries 1112 correlating process identification 544 with connection states 1113 recorded for particular process. Through the mechanism of Process Filter and Correlation 1106, by reading 1114 the information from the process repository, the operating system agent is able to compare current and previous states resulting in passing 1105 the processed information to OS Communication Event Generation 1102. In parallel, the network agent 541 communicates 1131 with the OS network subsystem which enables it to gather information for open information exchanges 1125 between processes and Network Communication logic that is not directly available in data structures polled by operating system agent. This information is passed 542 to the operating system agent that generates Network Communication Events 1101 which then can be bound with OS Communication Events through the mechanism of OS and Network Event Correlation and Cycling Reporting which is also responsible for passing 552 the correlated information to the monitoring node through the event channel 554. Additional role of the Process Repository 1111 is to track the process establishing and dropping the connection readiness as described in FIG. 24.

The data structures of OS Process Handle Table 841 and OS Network Connection Table 801 provide state of the processes and their communication activities at certain moment in time. The role of Cyclic OS Information Acquisition module 1107 together with Process Filter and Correlation 1106 and finally with OS Communication Event Generation module 1102 is not only to get the information from OS kernel 1121 to operating system agent 543, but also transform captured states into events describing changes in process states and states of their communication activities.

FIG. 12 defines the contents of the communication entries translating into a captured state and communication events translating into changes in the states. OS Communication Readiness Entry 12010 and OS Communication Entry 1220 are recorded based on comparing differences between consecutive polling attempts as described in FIG. 11.

OS Communication Readiness Entry contains Local Endpoint Identification Data 1212 including OS identification 1213, process identification 1214, network identification in the form of assigned IP address and port 1215, as well as indicator whether it is TCP or UDP communication 1216. As it is communication readiness, there is no Remote Endpoint identification yet. Through comparing consecutive entries, the monitoring system is able to detect a change and create a corresponding communication event 1230, carrying the same set of Local Endpoint Identification data 1223 (1233, 1234,1232,1236) supplemented with the change indicator 1231, that is whether the OS Communication Readiness just started or finished.

Similar set of information and logic is available for OS Communication Entries 1220 and OS Communication Events 1240. They both contain the same set of Local Endpoint Identification Data 1222 (1223,1223,1225,1227) 1242 (1243,1244,1244,1247), however, this time they are also containing information specific for open communication exchange, that is Client/Server role indicator 1226,1246 and Remote Endpoint Identification Data 1228,1248 realized by providing the remote endpoint IP address and port 1229,1249. Similar to Communication Readiness Entries and Events, the observed change in the state results in supplementing the OS Communication Event with the information whether the communication exchange started or finished 1241.

FIG. 13 describes algorithm of generation of OS Communication Readiness Events 1230 and OS Communication Events 1240.

Algorithm is triggered by the time event 1301. To provide good quality events, algorithm should start as often as possible. On the other hand, frequent reading of OS data structures may have influence on resource utilization and may affect overall system performance including actual OS and processes running on it. No matter how high the frequency is, there is no guarantee that a short living connection will not be missed.

The initial data gathering step 1302 is to read content of OS Process Handle Table 841 and OS network Connection Table 801. Data entries from both data sources must be matched and merged. This happens in subsequent step 1303. Handle identifications 812/821 and 851 of entries 812 and 842 from corresponding tables are used to do so. The result of merge is stored 1304 in temporary data structure: Current Repository of Connections. The goal of the remaining part of the algorithm is to find what is new in OS data structures and what was removed since the algorithm was run previous time. Checking for new entries is handled by section starting at step 1305. Checking for disappearing entries (when connections were over and process does not want to accept new connections) starts at step 1312.

The next step is to iterate 1305 over this data structure until we reach the end (1306) and for each entry fetched search 1307 for corresponding element in Process Repository 1111 among Process Entries 1112 and Connection Entries 1113 (when the monitoring system starts, this data structure is initially empty). If same entry was found (1308), it means that the state of it did not change; otherwise (1308) new entry appeared. Depending on type of entry (1309), the module generates 1310 OS Communication Readiness Event 1230 or generates 1311 OS Communication Event 1240, both with Status 1231 and 1241 respectively set to Started. The consequence of such events will be adding appropriate entries (1210 or 1222) to Process Repository 1111 under proper Process entry 1112 with Status 1217 set to Active (Applies only to OS Communication Readiness Entry).

When the algorithm is done with the review of Current Repository of Connection vs. Process Repository 1111 data, it must review Process Repository 1111 data vs. Current Repository of Connection. The next step is to iterate 1312 over all Connection entries 1113 of all Process Entries 1112 in Process repository 1111 until we reach the end 1313. And then, for each connection entry or connection readiness fetched from Process Repository, search 1314 for corresponding element in Current Repository of Connections. If entry is found (1315), nothing changes and there is no need to generate any event and take actions.

Conversely, depending on (1316) type of entry (communication entry or connection readiness entry) fetched, different actions need to be taken if entry is not found. If it is OS Communication Entry, algorithm triggers (1319) OS Communication Event 1240 with Status 1241 set to Finished (there was connection, and then no connection. It was shut down). The consequence of such event generation will be removal of OS Communication Entry 1220 from Process Repository 1111. If it is OS Communication Readiness Entry, algorithm triggers (1317) OS Communication Event 1230 with Status 1241 set to Finished. The consequence of such event generation will be setting Status 1217 of OS Communication Readiness Entry 1220 in Process Repository 1111 to "Inactive".

When the iteration 1312 reached the end of the data structure, the algorithm finishes 1320.

FIG. 14 presents an alternative system to the one presented in FIG. 11. Here, the OS Communication Readiness and OS Communication Events are recorded with the use of the in-process agent 714 instrumentation and Network System API calls interception 512. Through instrumentation and API calls interception, the monitoring system is momentarily notified on any system changes related to the network communication and can create corresponding events, without the need of comparing the states as retrieved through polling the OS data structures. The Network Communication Logic 901 within the network subsystem 508 utilizes the Communication Interface 1126 to control the communication exchange 571 with the network 570. The process involves the network endpoints 1123. All these entities are seen through intercepting 512 the API calls 1125 between the processes 506 and the network subsystem 508. Notifications about intercepted calls 703 are passed to In-Process Agents 714 and In-Process agents 714 send 1404 the notifications to Inter process communication buffer 1403 that becomes the source 1402 for in-process agent retriever and filter 1401 that sanitizes the information that can be passed 1105 to generate OS Communication Events 1102. The OS Communication Events are stored 1104 in the Process Repository 1111 containing entries 1112 composed of both Process Identification and Connection identification details 1113. Thanks to the in-process agent instrumentation, the monitoring system is capable of supplementing the process repository entries with process identification details 544/711. In parallel, the Network Agent 541 communicates 1131 with the OS network subsystem which enables it to gather information for open information exchanges between processes and network communication logic that is not retrieved through the API calls between the processes and network subsystem. This information is passed 542 to the operating system agent that generates Network Communication Events which then can be bound with OS Communication Events 1102 through the mechanism of OS and Network Event Correlation and Cycling Reporting which is also responsible for passing 552 the correlated information to the monitoring node through the event channel 554.

FIG. 15 shows an example how the monitoring system involving the in-process agent instrumentation and system API calls interception enriches the Communication Readiness Event with additional data depending on the level where it was gathered. At the API Interception level, the event 1500a indicates whether the communication readiness started or finished 1501a as seen in FIG. 15A. It also contains information on Local Endpoint Identification Data 1502a, that is the basic IP/Port network identification 1503a and whether the protocol used is TCP or UDP 1504a. Moving on further to the in-process agent level, the monitoring system is already aware that the Communication Readiness has been closed and it supplements the event with the process identification 1511b on top of already gathered Local Endpoint Identification Data 1502b, that is the basic IP/Port network identification 1503b and whether the protocol used is TCP or UDP 1504b as seen in FIG. 15B. Moving on further to the operating system agent level, the monitoring system is capable of supplementing the event with the OS identification 1512c on top of already gathered Local Endpoint Identification Data 1502c, that is the basic IP/Port network identification 1503c and whether the protocol used is TCP or UDP 1504b, as well as process identification details 1512c as seen in FIG. 15C.

FIG. 16 shows an example how the monitoring system involving the in-process agent instrumentation and system API calls interception enriches the Communication Event with additional data depending on to the level where it was gathered. At the API Interception level, the event 1600a indicates whether the communication readiness started or finished 1601a. It also contains information on Local Endpoint Identification Data, that is the basic IP/Port network identification 1603a and whether the protocol used is TCP or UDP 1604a as seen in FIG. 16A. At this moment, in the network communication exchange, the monitoring system is also capable of recording the Remote Endpoint Communication Data 1606a, that is the basic IP/Port network identification 1607a. Moving on further to the in-process agent level, the event is supplemented with the process identification 1611b on top of already gathered Local Endpoint Identification Data 1602b, that is the basic IP/Port network identification 1603b, whether the protocol used is TCP or UDP 1604b, the role in the communication, that is whether it is a client or server 1605b, as well as Remote Endpoint Communication Data 1606b (1607b) as seen in FIG. 15B. Moving on further to the operating system agent Level, the monitoring system is capable of supplementing the event with the OS identification 1612c on top of already gathered Local Endpoint Identification Data 1602c, that is the basic IP/Port network identification 1603c, whether the protocol used in TCP or UDP 1604c, the as process identification details 1612c, the role in the communication, that is whether it is a client or server 1603c, as well as Remote Endpoint Communication Data 1606c (1607c) as seen in FIG. 16C.

FIG. 17 presents a block diagram that conceptually describes a network agent 541 and the modules of the operating system with which the network agent interacts. The OS network subsystem 508 operates in the operating system kernel space 1121 of an operating system. The OS network subsystem provides one or more interfaces 1123 that may be identified by an IP address and port, and that represent individual network connections. Those interfaces may be accessed 1124 by processes running in the user space of the operating system to establish communication channels with other processes running on other operating systems and to exchange data with those other processes.

The OS network subsystem consists of a network communication logic 1126, which interacts with physical communication interfaces 1125, to translate data representing network communication requests received from processes 1124 into a form that is capable to be transferred over a connecting computer network 570. In addition, the network communication logic receives data from the connecting computer network and translates it into a form capable to be sent 1124 to and processed by destination processes.

A packet copying unit 1708 is installed in the network communication logic and configured to copy all sent and received network packets and send 1131 them to the network agent 541 for analysis.

Most types of operating systems provide a built-in packet copying functionality which only needs to be configured to interact with the network agent, or they allow to install drivers that listen to network activity and copy and provide network packets representing this network activity to the network agent.

On receiving the packets, the network agent stores them in a packet buffer. Conceptually, those packets may be split into packets signaling the establishment or shutdown of a server side communication socket, capable to receive and process client side communication requests, packets signaling the establishment or shutdown of a connection, and packets signaling the transfer of data on an established connection.

On receipt of a new packet in the packet buffer, the TCP/IP connection tracker 1702 analyzes the new packet and determines if it notifies a new or closed socket on which a server is listening, a new established or closed connection, or data transmitted over an established connection. The result of this analysis is stored by the TCP/IP connection tracker in TCP/IP connection repository 1703 which contains data record representing the currently open server side sockets, the currently opened communication channels and their usage. A packet analysis and measurement unit 1704 receives and analyzes packet data from the packed buffer, data representing current network connections from the TCP/IP connection repository and creates network packet related measurement data that is stored in a packet measurement buffer. This measurement data may contain, but is not limited to, measurement data describing the number of resends for a specific packet, the network latency effective for a specific packet. The TCP/IP connection tracker may also create connection related measurements and store them in the packet measurement buffer, like e.g. measures describing the number of rejected connections, together with the reason for the reject, or the number of accepted connections by a server side socket.

All created network measurements are tagged in a way that allows to identify the corresponding network connection or server side port they describe.

The network measurements stored in the packet measurement buffer 1704 may cyclically be fetched by a network event generator 1706, which forwards them to the operating system agent 543/523. Various forms of communication may be used to transfer the measurement data, which include, but are not limited to, file based transfer, shared memory or pipes.

It is noteworthy that the described embodiment shows an operating system agent and a network agent which are implemented as independent, loosely coupled processes. This allows to assign different, and task adapted security levels to both agents, like e.g. providing the network agent only access rights required to monitor low-level network activity, and providing the operating system agent only access rights required to monitor running processes and their high-level network usage. However, network agent and operating system agent may be integrated into one universal agent monitoring both low-level network and processes without departing from the spirit and scope of the disclosed invention.

FIG. 18 presents a diagram explaining the states of and logic applied by the network agent to detect whether the TCP session establishment attempt is successful or unsuccessful. When network agent observes a classic three-way handshake, that is a sequence of SYN Packet from Client to Server 1802 (received when in initial state 1801 and transferring state to 1803), answered by SYN/ACK packet from Server to Client 1804 (when in state 1803 and transferring state to 1805) that is acknowledged by ACK Packet from Client to Sever 1806 (leading to a final state of connection establishment 1807), it stores the TCP/IP connection details in its TCP/IP Connection Repository 1810 and generates Network Communication Attempt-Successful event 1811. Contrarily, network agent generates Network Communication Attempt-Unsuccessful 1812, when the initial connection establishment expressed with SYN Packet from Client to Server is either followed with the RST Packet from Client to Server 1808 or no further communication is observed within a defined timeout 1809. Network agent applies a similar logic when crating the Network Communication Shutdown Events.

The examples of information carried by Network Communication Events 1901, 1921 generated by network agent are presented in FIG. 19. Similarly to the events generated by operating system agent, they contain Local and Remote Endpoint Identification Data 1902,1922,1904,1924, that is basic IP/Port Network identification 1903, 1907,1923,1927, indicators whether the role played is client or server 1904, 1924, indicators whether TCP or UDP communications is used 1905,1925. Through direct access to the network interfaces, network agent is also capable of providing the Network Interface Identification details 1908,1928. For Network Communication Attempt Events, network agent also stores information whether the attempt was successful or not, applying the algorithm explained in FIG. 18. Network agent generates the Communication Quality metrics 1930 and they are also included as the event contents. These are the Network Performance Measurements 1931 such as Round Trip Time for network latency, Throughput that is speed of transmission for each direction, the Availability Measurements 1932 such as Zero-Windows size events and Ambient Measurements 1933 read directly from the Network Interface such as Network Interface Utilization Over Time.

Referring now to FIG. 20, the operating system agent is able to create rich Communication Events to be passed to the monitoring node, by correlating the OS Communication Events created either through polling the OS data structures or through in-process agent instrumentation with the Network Communication Events created by Network Agent. FIG. 20 shows an example of how OS and Network Communication events created as a result of recording an attempt to set up a communication process with a remote host. Both events contain Local 1242, 1902 and Remote 1248,1906 Endpoint Identification data. Through matching these fields, operating system agent creates a rich Communication Event containing the complete set of monitoring data acquired through the monitoring process.

Referring now to FIG. 21, it shows an example of a similar correlation process happening for Network Communication Events indicating open connection exchange and OS Communication Entries stored by operating system agent in the Process Repository. Operating system agent creates rich Communication Events to be passed to the monitoring node, by correlating the OS Communication Entries created either through polling the OS data structures or through in-process agent instrumentation with the Network Communication Events created by network agent. FIG. 21 shows an example of how OS Communication entries and Network Communication events created as a result of recording an open communication exchange with a remote host are correlated to create a Communication Event. Both entities contain Local 1242, 1902 and Remote 1248, 1906 Endpoint Identification data. Through matching these fields, operating system agent creates a rich Communication Event containing the complete set of monitoring data acquired through the monitoring process. The same correlation process is applied to Network Communication Shutdown Events created by network agent.

Referring now to FIG. 22, the events generated by network agent 541 sent through Network Communication Event Generation 1101 module as well as events related to process communication sourced from OS Communication Event Generation module 1102 together with state stored in Process Repository 1111 meet up in OS and Network Event Correlation and cyclic Reporting module 1103. Relationship between data carried by events was visually described in FIG. 20 and FIG. 21, but it is also important to understand different scenarios and when correlations happen. FIG. 22 visually summarizes all scenarios and shows sources of correlating events or data sources from which data is read together with time relationships between them.

First scenario does not even reach the correlation level as it is based only on an OS event: OS Communication Readiness Event (Started) 1230 passed through OS Communication Event Generation 1102 adds to Process Repository 1111 proper OS Communication Readiness Entry 1210.

Second scenario happens on communication start when OS Communication Event 1240 is released by OS Communication Event Generation 1102. This event results in creation of OS Communication entry 1220 in Process Repository 1111 and meets (2001) with Network Communication Attempt Event 1901 released from Network Communication Event Generation 1101 (sourced from network agent 541). Matching 2001 occurs inside of Network Event Correlation and cyclic reporting module 1103 according to the rules described in FIG. 20 and results in generation of Communication Event 2011 containing complete set of information ready to be sent to Event Channel 552 leading to monitoring node 560.

When the connection is established and communication happens (an established TCP connection can be quiet and do not exchange any data). Periodically generated Network Communication Event 1921 is correlated 2101 with corresponding OS Communication Entry 1221 stored in Process Repository 1111. The consequence of this correlation is generation of Communication Event 2011 containing complete set of information ready to be sent to Event Channel 552 leading to monitoring node 560.

When the connection is shut down, the Network Communication Shutdown Event 2205 is issued by network agent. Data carried by this event is identical with Network Communication Event 1921. Network Communication Shutdown Event 2205 is correlated 2206 with OS Communication Event 1240 with Status 1241 set to Finished. Agent is aware of connection shutdown and corresponding OS Communication Entry 1220 is removed from Process Repository 1111.

Referring now to FIG. 23, which visually describes the correlation of two communication events 2011a and 2011b sent by different operating system agents 543 deployed to a client operating system 501 and a server operating system 505.

A client process 1501, with a process identifier A 2301a resides on the client operating system and uses network interface of the client operating system to initiate a TCP/IP communication 571 with server process 506 residing on the server operating system 505. The client side communication endpoint identification data 2304a consists of an IP address "1" and a port number "2". The operating system agent 543 deployed to the client operating system monitors 524 the client process 502 and detects the initiated TCP/IP communication. The operating system agent 543 cooperates with a network agent 521 also deployed to the client operating system to get measurement data describing quality and performance of the initiated TCP/IP communication as visible from the client operating system (not shown on the figure for clarity).

The operating system agent 523 deployed to the client operating system reports monitoring data describing the client side view of the detected TCP/IP communication in form of Communication Event 2011a. The OSid 2013a of the local endpoint identification data 2012a is set to "X", the OSid 2302a determined by the operating system agent 523 deployed to the client operating system to uniquely identify this operating system. The PID 2014a is set to "A", identifying the client process, the IP address and port field 2015a is set to indicate IP address "1" and port "2", which was used on the client side to initiate the communication. The client/server indicator 2016a is set to indicate a client side endpoint, and the TCP/UDP indicator 2017a is set to indicate a TCP/IP based communication. The IP address and port field 2019a of the remote endpoint identification data 2018a is set to indicate an IP address "3" and a port number "4", as the initiated TCP/IP connection was directed to port number "4" on IP address "3". The interface identifier field 2022a of the interface identified data 2021a is set to "I", identifying the network interface used for the reported network communication. The data of the local communication quality metrics 2023a is set to measurement data describing the quality and performance of the network communication as visible to the client side part of the communication. The local communication quality metrics may be provided by a network agent. The created communication event 2011a is sent to an external monitoring node or monitoring server 560 for further processing.

The TCP/IP communication 571 initiated by the client process 502 is received by the network interface "J" 2304b of the server operating system 505 with a receiver IP address "3" and port number "4". As server process 2 506 listens for incoming TCP/IP communications on port "4", the incoming TCP/IP communication is forwarded to server process 2 to process it and optionally generate and provide data requested by the client process 502 with the initiated TCP/IP communication. The Operating system agent 543 deployed to the server operating system 505 running the server process 2 506, monitors 544 activities of the server process 2 and detects the incoming TCP/IP communication directed to server process 2. The Operating system agent 543 creates a communication event 2011b representing the monitored incoming TCP/IP connection and sets its local endpoint identification data 2012b with an OSid 2013b value "Y", identifying the server operating system 504 and a process identification value 2014b of "B" identifying the server process 2 506. Further, it sets the IP address and port field 2015b to indicate the IP address "3" and the number of the port "4" on which the incoming TCP/IP connection was recognized. Further, it sets the client/server indicator 2016b of the local endpoint identification data to "S" to indicate that the local endpoint identification data describes the server part of a network communication and it sets the TCP/UDP indicator to "TCP" to indicate a TCP based communication. The IP address and port field 2019b of remote endpoint identification data 2018b is set to indicate IP address "1" and port "2", which identifies the origin of the incoming network communication. The operating system agent 543 may further cooperate with the network agent 541 deployed to the server operating system 505 to determine the network interface used to receive the network connection, which would be the network interface with the identifier "J" in this example, and set the interface identifier for 2022b of the interface id field 2021b to identify network interface "J". In addition, the operating system agent may request local communication quality metric data, describing the quality and performance of the network communication as visible from the server side from the network agent and store it in the local communication quality metrics field 2023b of the created communication event 2011b. The initialized communication event 2011b is sent to an external monitoring server 560 for further processing and correlation.

It is noteworthy that even if operating system agent and network agent deployed to client operating system and server operating system are identified with different reference numeral, the operating system agent 523 on the client operating system may be functionally identical with the operating system agent 543 on the server operating system. Same is applicable for network agent 521 and 541.

Both Operating system agents 523 and 543 send their communication events 2011a and 2011b to the same external monitoring server. On receiving communication events like 2011a and 2011b, the monitoring server tries to identify pairs of communication events that describe the opposite endpoints of one network communication. The identification of communication event pairs may be performed by crosswise comparing the IP address and port field 2015 of the local endpoint identification data 2012 with the IP address and port field 2019 of the remote endpoint identification data 2019. In the described example, the IP address and port field 2014*a* are compared 2312 with the IP address and port field 2019*b*, and field 2014*b* is compared 2311 with field 2019*a*. If local and remote IP address and port data matches in both directions, the client server indicators 2015*a* and 2015*b* and TCP/UDP indicators may be analyzed 2310. Communication events with cross-wise matching IP address and port fields may only be considered as matching and describing the two endpoints of one monitored network communication if the TCP/UDP indicators indicate the same protocol and if the client server indicator indicates that one communication event indicates a server side endpoint and the other indicates a client side endpoint. The monitoring server may in addition use other data contained in the communication events to determine if two communication events match. As an example, the server may compare timestamp data indicating the point in time when the monitored communication activity occurred, and in case of timestamps with a difference higher than a specific threshold (e.g. 5 minutes) refuse to pair two communication events.

In case the monitoring server 560 identifies two matching communication events, as in the current example events 2011*a* and 2011*b*, it creates a process to process communication record 2331, which represents the monitored communication activity.

The monitoring server 560 may combine 2321 OSId 2013*a* and process identifier 2014*a* of the communication event 2011*a* representing the client side endpoint of the communication into an identifier, which uniquely identifies the client process 502 running on the client operating system 501 that initiated the communication. The identifier is stored in the client entity identifier field 2332 of the process to process communication record. Further, monitoring server may store the local communication quality metrics 2023*a* received with the communication event representing the client side view of the communication in the client communication quality metrics field 2334 of the created process to process communication record. Afterwards, a server entity identifier 2333 may be created out of OSid 2013*b* and process identifier 2014*b*, and the local communication quality metrics 2023*b* received with the server side communication event 2011*b* are stored to the server communication quality metrics 2335 of the created process to process communication record. It is noteworthy that communication events describing opposite endpoints of one network communication may arrive at the monitoring server at different points in time. The monitoring server needs to be aware of this and provide measures that allow pairing of communication events that arrive on different points in time, like e.g. temporarily buffering those events. The methods described herein and the data describing the quality and performance of monitored network communications may be used to enrich and complement the topological data created by the monitoring system described in U.S. patent application Ser. No. 14/879,183 "Method And System For Real-Time Modeling Of Communication, Virtualization And Transaction Execution Related Topological Aspects Of Monitored Software Applications And Hardware Entities" by Greifeneder et. al., which is included herein by reference in its entirety.

Additional application of events generated by network agent from analysis of network traffic is detecting failed connection attempts and associating them to known processes. FIG. 24 presents comparison of typical and successful TCP/IP connection setup sequence with unsuccessful connection setups failed due to different reasons. FIG. 24*a* shows well known client process running on client host 101*a* issuing request 121 to API Method 113*a* in process 112*a* running on operating system 111*a* via own network subsystem, communication network, server's network subsystem 114 and finally open socket 2401 binding process with communication resources. Response 112 is passed in similar way, but in reversed direction. Initial fragment of typical and successful connection setup sequence 128 is shown for reference.

FIG. 24*b* shows attempt to execute same scenario, but in different conditions. Client process running on client OS 101*b* attempts 2410 to connect to the server, but server process 112*b* is not available any more. Apparently it crashed and was not restarted by any of systems mechanisms nor by user or administrators hand. Server process 112*b* is not up and running and as a consequence server is not available. Network subsystem 114 is such situation does not understand the value of destination TCP port and cannot notify anyone about incoming connection. The situation is completely handled by Network Subsystem 114. Subsystem decides if to inform client about unavailability (2412) of the server side, or just do nothing counting that Network Subsystem of client host will time out and detect such situation by itself. Packet exchange drawing 2411 explains the packet sequence in scenario when client is notified about connection attempt failure via sent packet RST in response to its packet SYN FIG. 24*c* also presents the problems with service availability. Process 112*c* with 113*c* API Method are still up and running, but it does not accept new connections. The most popular reason for such behavior is misconfiguration of the system or limited resources not allowing to accept subsequent connections. Again, the attempt 2410 is made for connection by client 101*c* and it reaches server's network subsystem 114 of Server Instance 111*c*. Although the socket 2401 is still open, subsystem 114 decides if to inform client about unavailability of the server, or just do nothing counting that Network Subsystem of client host will time out and detect such situation by itself. Packet exchange drawing 2422 explains the packet sequence in scenario when client attempts to connect, but is not notified about failed connection setup.

Algorithm detecting such situations is presented on FIG. 25. To realize this, the repository of processes and communication readiness states is necessary. This data structure 1111 was already presented on FIG. 11 and FIG. 14 and contains process entries 1112 with communication entries 1113, in this particular case relevant, Communication Readiness Entries 1210. Updates 1104 to process repository are controlled by operating system agent and happen according to algorithm triggered 2500 by registration of OS Communication Readiness Event 1230 with Status 1231 set to 'Started'. OS Communication Readiness Entry 1210 is created with Status (1217) set to 'Active' and stored as a second step 2501 of the algorithm. Then the algorithm concludes 2502.

Modification of the repository 1111 can also happen. On registration 2510 of OS Communication Readiness Event 1230 with Status 1231 set to 'Finished' algorithm starts and in its second step 2511, proper OS Communication Readiness Entry 1210 is marked 'Inactive' in its Status field 1217. Then the algorithm concludes 2512.

In order to make this data structure 1111 maintainable and its usage practical, OS Communication Readiness Entries 1210 with status 'Inactive' should be periodically removed.

Cyclic timer event 2520 initiates the process. In the review of the data structure 2521 the decision is made and entries older than configured value are removed. If process entry does not hold any entries any more, this entry can be removed too. Then the algorithm concludes 2522.

With data structure maintained this way, it is possible to detect process availability problems and moreover remote processes attempting to connect to processes with availability problems or former processes. On registration 2530 of Network Communication Attempt Event 1901, first we check if the attempt was successful (2531). If the answer is 'yes' (2532), the algorithm concludes 2541 as apparently the connection was established and there are no availability problems.

If the answer is 'no' (2532), the next step is the lookup in the process repository 1111 for a process owning specific IP address and port number 1903 found in the event. If not found (2534), the proper 'Connection attempt to unknown process' event is triggered 2535. This is the symptom of situation described on FIG. 24*b* in case when the process 112*b* was never up and running, was not up and running since the monitoring system startup or was up and running, but enough time passed for it to be forgotten by the system due to algorithm initiated by time event 2520. Then the algorithm concludes 2541.

If the answer is 'yes' (2534), the next step is to verify (2536) the state 1217 of OS Communication Readiness Entry 1210 found and the state of the process 1112 owning this entry. If this specific OS Communication Readiness Entry 1210 is in state set to 'Inactive' and the process entry 1112 is in state 'Inactive' as well, this is the symptom that the process was shut down. As a consequence of this detection, the algorithm generates "Connection attempt to process down" event 2537. Then the algorithm concludes 2541.

If the answer is 'no' (2536), the next step (2538) is to verify the state 1217 of OS Communication Readiness Entry 1210. If process is 'Active', but the state 1217 of OS Communication Readiness Entry 1210 is 'Inactive', this is the symptom of situation that process is up and running, but it does not accept any incoming communication. This may be the result of faulty process behavior, like premature giving up communication readiness. Generation of "Process fault or misconfigured" event is generated 2539 and the algorithm concludes 2541.

Answer 'yes' to the last question (2538), generates "Process overloaded event" 2540. This is the symptom of situation when process is up and running and has still declared communication readiness on specific port, but due to overload or other imposed limitations is not accepting any new communication from new clients. A "Process overload" event is generated 2540 and the algorithm concludes 2541.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring performance in a distributed computing environment, comprising:
   instrumenting an operating system on a computing device with an operating system agent and a network agent;
   determining, by an operating system agent, a process associated with each network connection handled by the operating system;
   detecting, by the operating system agent, a change in state of a given network connection handled by the operating system;
   generating, by the operating system agent, a communication event in response to detecting a change in the state of the given network connection, where the communication event includes identifying information for the given network connection, the state of the given network connection, and an identifier for the process associated with the given network connection;
   determining, by the network agent, identifying information for the given network connection;
   determining, by the network agent, performance metrics from data packets transmitted via the given network connection and processed by the network agent;
   correlating, by the operating system agent, the performance metrics for the given network connection with the communication event using the identifying information for the given network connection; and
   transmitting, by the operating system agent, the communication event across a network to a monitoring node located remotely from the computing device;
   wherein detecting a change in state of a given network connection handled by the operating system further comprises:
     instrumenting processes with an in-process agent;
     registering, by the in-process agent, with an operating system interface, where the operating system interface provides notifications for system changes regarding network connections handled by the operating system;
     receiving, by the in-process agent, notifications for system changes regarding the given network connection from the operating system interface; and
     passing, by the in-process agent, the notifications to the operating system agent.

2. The computer-implemented method of claim 1 wherein determining performance metrics pertaining to the given network connection further comprises
   receiving data packets from a kernel of the operating system;
   storing the data packets in a buffer; and
   analyzing the data packets associated with the given network connection, thereby determining performance metrics pertaining to the given network connection.

3. The computer-implemented method of claim 2 wherein the performance metrics include number of rejected connections and number of accepted connections by a socket.

4. The computer-implemented method of claim 1 further comprises
   receiving, by the monitoring node, a first communication event from the computing device;
   receiving, by the monitoring node, a second communication event from another computing device, where the second communication event includes identifying information for the given network connection, the state of the given network connection, and an identifier for a second process associated with the given network connection; and
   correlating, by the monitoring node, first communication event with the second communication event.

5. The computer-implemented method of claim 1 wherein the operating system agent is configured with access control that differs from access control of the network agent.

6. The computer-implemented method of claim 1 further comprising:
   maintaining, by the operating system agent, current state of the given network connection in a process repository;
   receiving, by the operating system agent, a communication attempt event for the given network connection from the network agent;
   retrieving, by the operating system agent, the current state of the given network connection from the process repository;
   determining, by the operating system agent, a cause of a failed communication attempt over the given network connection using the current state of the given network connection; and
   appending, by the operating system agent; the cause of the failed communication attempt to the communication event prior to the transmission of the communication event to the monitoring node.

7. The computer-implemented method of claim 6 further comprising:
   identifying the cause of the failed communication attempt as a process shutdown when status of the process is inactive and status of the given network connection is inactive;
   identifying the cause of the failed communication attempt as a process misconfigured when status of the process is active and status of the given network connection is inactive;
   identifying the cause of the failed communication attempt as a process misconfigured when status of the process is active and status of the given network connection is active; and
   identifying the cause of the failed communication attempt as a process unknown when an entry for the process is not found in the process repository.

8. A computer-implemented system for monitoring performance in a distributed computing environment, comprising:
   an operating system agent instrumented in an operating system on a computing device and executed by a processor of the computing device, the operating system agent determines a process associated with each network connection handled by the operating system and detects a change in state of a given network connection handled by the operating system and, in response to detecting a change in the state of the given network connection, generates a communication event, where the communication event includes identifying information for the given network connection, the state of the given network connection, and an identifier for the process associated with the given network connection; and
   a network agent instrumented in the operating system on the computing device and executed by the processor of the computing device, the network agent determines identifying information for the given network connection and determines performance metrics from data packets received via the given network connection;

wherein the operating system agent correlates the performance metrics for the given network connection with the communication event using the identifying information for the given network connection and transmits the communication event across a network to a monitoring node located remotely from the computing device;

wherein operating system agent detects a change in state of a given network connection handled by the operating system by:

instrumenting processes with an in-process agent;

registering, by the in-process agent, with an operating system interface, where the operating system interface provides notifications for system changes regarding network connections handled by the operating system;

receiving, by the in-process agent, notifications for system changes regarding the given network connection from the operating system interface; and passing, by the in-process agent, the notifications to the operating system agent.

9. The computer-implemented system of claim 8 wherein the network agent determines performance metrics pertaining to the given network connection by:

receiving data packets from a kernel of the operating system;

storing the data packets in a buffer; and analyzing the data packets associated with the given network connection, thereby determining performance metrics pertaining to the given network connection.

10. The computer-implemented system of claim 9 wherein the performance metrics include number of rejected connections and number of accepted connections by a socket.

11. The computer-implemented system of claim 8 wherein the monitoring node receives a first communication event from the computing device; receives a second communication event from another computing device, where the second communication event includes identifying information for the given network connection, the state of the given network connection, and an identifier for a second process associated with the given network connection; and correlates the first communication event with the second communication event.

12. The computer-implemented system of claim 8 wherein the operating system agent is configured with access control that differs from access control of the network agent.

13. The computer-implemented system of claim 8 wherein the operating system agent maintains current state of the given network connection in a process repository; receives a communication attempt event for the given network connection from the network agent; retrieves the current state of the given network connection from the process repository; determines a cause of a failed communication attempt over the given network connection using the current state of the given network connection; and appends the cause of the failed communication attempt to the communication event prior to the transmission of the communication event to the monitoring node.

14. The computer-implemented system of claim 13 wherein the operating system agent determines a cause of a failed communication attempt by:

identifying the cause of the failed communication attempt as a process shutdown when status of the process is inactive and status of the given network connection is inactive;

identifying the cause of the failed communication attempt as a process misconfigured when status of the process is active and status of the given network connection is inactive;

identifying the cause of the failed communication attempt as a process misconfigured when status of the process is active and status of the given network connection is active; and identifying the cause of the failed communication attempt as a process unknown when an entry for the process is not found in the process repository.

* * * * *